United States Patent [19]

Walters et al.

[11] Patent Number: 5,045,176
[45] Date of Patent: Sep. 3, 1991

[54] CARBOMETALLIC OIL CONVERSION WITH BALLISTIC SEPARATION

[75] Inventors: Paul W. Walters, Ashland; Roger M. Benslay, Catlettsburg; Dwight F. Barger, Russell, all of Ky.

[73] Assignee: Ashland Oil, Inc., Ashland, Ky.

[21] Appl. No.: 474,686

[22] Filed: Feb. 5, 1990

Related U.S. Application Data

[60] Continuation of Ser. No. 521,504, Aug. 8, 1983, abandoned, which is a continuation-in-part of Ser. No. 438,074, Nov. 1, 1982, Pat. No. 4,495,063, which is a division of Ser. No. 263,394, May 13, 1982, Pat. No. 4,390,503.

[51] Int. Cl.[5] .................. C10G 11/00; C10G 9/28
[52] U.S. Cl. .................... 208/113; 208/127; 208/132; 208/161
[58] Field of Search ............... 208/113, 161, 127, 126, 208/132; 55/1, 342; 502/43, 49

[56] References Cited

U.S. PATENT DOCUMENTS

| | | | |
|---|---|---|---|
| 4,219,407 | 8/1980 | Haddad et al. | 208/151 |
| 4,288,235 | 9/1981 | Gartside et al. | 55/196 |
| 4,295,961 | 10/1981 | Fahrig et al. | 208/161 |
| 4,299,687 | 11/1981 | Myers et al. | 208/113 |
| 4,318,800 | 3/1982 | Woebcke et al. | 208/127 |
| 4,394,349 | 7/1983 | Cartmell | 208/153 |
| 4,435,279 | 3/1984 | Busch et al. | 208/111 |
| 4,477,335 | 10/1984 | Benslay | 208/113 |

FOREIGN PATENT DOCUMENTS

| | | |
|---|---|---|
| 330025 | 6/1930 | United Kingdom . |
| 674473 | 6/1952 | United Kingdom . |
| 816550 | 7/1959 | United Kingdom . |

Primary Examiner—Olik Chaudhuri
Assistant Examiner—G. Fourson
Attorney, Agent, or Firm—Richard C. Willson, Jr.; C. Williams Crady

[57] ABSTRACT

A vented cup ballistic separation device and method of use for achieving rapid separation of a suspension of fluidized solid particulate and gasiform material. The vented cup ballistic separation apparatus is useful in a wide variety of vapor-solid contacting devices where rapid separation of solids from vapor is desired e.g. in fluidized catalytic cracking systems. The vented cup ballistic separation apparatus particularly comprises annular chamber about the outer periphery of an open ended riser conduit. The annular chamber is open in the upper end and one or more open end conduits extend outwardly from the annular chamber to provide means for discharging vapors and also for attachment of cyclone separation means if desired. The riser with vented cup or annular chamber preferably terminates within a larger diameter chamber.

5 Claims, 3 Drawing Sheets

CARBOMETALLIC OIL CONVERSION WITH BALLISTIC SEPARATION

This application is a File Wrapper Continuation application of U.S. Ser. No. 06/521,504, filed Aug. 8, 1983, now abandoned; which is itself a Continuation-in-Part of U.S. Ser. No. 06/438,074, filed Nov. 1, 1982, now U.S. Pat. No. 4,495,063 issued Jan. 22, 1985; which is itself a divisional of U.S. Ser. No. 06/263,394, filed May 13, 1982, now U.S. Pat. No. 4,390,503, issued June 28, 1983.

TECHNICAL FIELD

This invention relates to processes for converting heavy hydrocarbon oils into lighter fractions, and especially to processes for converting heavy hydrocarbons containing high concentrations of coke precursors and heavy metals into gasoline and other liquid hydrocarbon fuels.

BACKGROUND ART

In general, gasoline and other liquid hydrocarbon fuels boil in the range of about 38° C. to about 343° C. (100° F. to about 650° F.). However, the crude oil from which these fuels are made contains a diverse mixture of hydrocarbons and other compounds which vary widely in molecular weight and therefore boil over a wide range. For example, crude oils are known in which 30 to 60% or more of the total volume of oil is composed of compounds boiling at temperatures above 343° C. (650° F.). Among these are crudes in which about 10% to about 30% or more of the total volume consists of compounds so heavy in molecular weight that they boil above 552° C. (1025° F.) or at least will not boil below 552° C. (1025° F.) at atmospheric pressure.

Because these relatively abundant high boiling components of crude oil are unsuitable for inclusion in gasoline and other liquid hydrocarbon fuels, the petroleum refining industry has developed processes for cracking or breaking the molecules of the high molecular weight, high boiling compounds into smaller molecules which do boil over an appropriate boiling range. The cracking process which is most widely used for this purpose is known as fluid catalytic cracking (FCC). Although the FCC Process has reached a highly advanced state, and many modified forms and variations have been developed, their unifying factor is that a vaporized hydrocarbon feedstock is caused to crack at an elevated temperature in contact with a cracking catalyst that is suspended in the feedstock vapors. Upon attainment of the desired degree of molecular weight and boiling point reduction the catalyst is separated from the desired products.

Crude oil in the natural state contains a variety of materials which tend to have quite troublesome effects on FCC Processes, and only a portion of these troublesome materials can be economically removed from the crude oil. Among these troublesome materials are coke precursors (such as asphaltenes, polynuclear aromatics, etc.), heavy metals (such as nickel, vanadium, iron, copper, etc.), lighter metals (such as sodium, potassium, etc.), sulfur, nitrogen and others. Certain of these, such as the lighter metals, can be economically removed by desalting operations, which are part of the normal procedure for pretreating crude oil for fluid catalytic cracking. Other materials, such as coke precursors, asphaltenes and the like, tend to break down into coke during the cracking operation, which coke deposits on the catalyst, impairing contact between the hydrocarbon feedstock and the catalyst, and generally reducing its potency or activity level. The heavy metals transfer almost quantitatively from the feedstock to the catalyst surface.

If the catalyst is reused again and again for processing additional feedstock, which is usually the case, the heavy metals can accumulate on the catalyst to the point that they unfavorably alter the composition of the catalyst and/or the nature of its effect upon the feedstock. For example, vanadium tends to form fluxes with certain components of commonly used FCC catalysts, lowering the melting point of portions of the catalyst particles sufficiently so that they begin to sinter and become ineffective cracking catalysts. Accumulations of vanadium and other heavy metals, especially nickel, also "poison" the catalyst. They tend in varying degrees to promote excessive dehydrogenation and aromatic condensation, resulting in excessive production of carbon and gases with consequent impairment of liquid fuel yield. An oil such as a crude or crude fraction or other oil that is particularly abundant in nickel and/or other metals exhibiting similar behavior, while containing relatively large quantities of coke precursors, is referred to herein as a carbo-metallic oil, and represents a particular challenge to the petroleum refiner.

In general, the coke-forming tendency or coke precursor content of an oil can be ascertained by determining the weight percent of carbon remaining after a sample of that oil has been pyrolyzed. The industry accepts this value as a measure of the extent to which given oil tends to form non-catalytic coke when employed as feedstock in a catalytic cracker. Two established tests are recognized, the Conradson Carbon and Ramsbottom Carbon tests, the former being described in ASTM D189-76 and the latter being described in ASTM Test No. D524-76. In conventional FCC practice, Conradson carbon values on the order of about 0.05 to about 1.0 are regarded as indicative of acceptable feed. The present invention is concerned with the use of hydrocarbon feedstocks which have higher Conradson carbon values and thus exhibit substantially greater potential for coke formation than the usual feeds.

Since the various heavy metals are not of equal catalyst poisoning activity, it is convenient to express the poisoning activity of an oil containing a given poisoning metal or metals in terms of the amount of a single metal which is estimated to have equivalent poisoning activity. Thus, the heavy metals content of an oil can be expressed by the following formula (patterned after that of W. L Nelson in *Oil and Gas Journal*, page 143, Oct. 23, 1961) in which the content of each metal present is expressed in parts per million of such metal, as metal, on a weight basis, based on the weight of feed:

$$\text{Nickel Equivalents} = \text{Ni} + \frac{\text{V}}{4.8} + \frac{\text{Fe}}{7.1} + \frac{\text{Cu}}{1.23}$$

According to conventional FCC practice, the heavy metal content of feedstock for FCC processing is controlled at a relatively low level, e.g., about 0.25 ppm Nickel Equivalent or less. The present invention is concerned with the processing of feedstocks containing metals substantially in excess of this value and which therefore have a significantly greater potential for accumulating on and poisoning catalyst.

The above formula can also be employed as a measure of the accumulation of heavy metals on cracking catalyst, except that the quantity of metal employed in the formula is based on the weight of catalyst (moisture free basis) instead of the weight of feed. In conventional FCC practice, in which a circulating inventory of catalyst is used again and again in the processing of fresh feed, with periodic or continuing minor addition and withdrawal of fresh and spent catalyst, the metal content of the catalyst is maintained at a level which may for example be in the range of about 200 to about 600 ppm Nickel Equivalents. The process of the present invention is concerned with the use of catalyst having a substantially larger metals content, and which therefore has a much greater than normal tendency to promote dehydrogenation, aromatic condensation, gas production or coke formation. Therefore, such higher metals accumulation is normally regarded as quite undesirable in FCC processing.

There has been a long standing interest in the conversion of carbo-metallic oils into gasoline and other liquid fuels. For example, in the 1950s it was suggested that a variety of carbo-metallic oils could be successfully converted to gasoline and other products in the Houdresid process. Turning from the FCC mode of operation, the Houdresid process employed catalyst particles of "granular size" (much larger than conventional FCC catalyst particle size) in a compact gravitating bed, rather than suspending catalyst particles in feed and produce vapors in a fluidized bed.

Although the Houdresid process obviously represented a step forward in dealing with the effects of metal contamination and coke formation on catalyst performance, its productivity was limited. Because its operation was uneconomical, the first Houdresid unit is no longer operating. Thus, for the 25 years which have passed since the Houdresid process was first introduced commercially, the art has continued its arduous search for suitable modifications or alternatives to the FCC Process which would permit commercially successful operation on reduced crude and the like. During this period a number of proposals have been made; some have been used commercially to a certain extent.

Several proposals involve treating the heavy oil feed to remove the metal therefrom prior to cracking, such as by hydrotreating, solvent extraction and complexing with Friedel-Crafts catalysts, but these techniques have been criticized as unjustified economically. Another proposal employes a combination cracking process having "dirty oil" and "clean oil" units. Still another proposal blends residual oil with gas oil and controls the quantity of residual oil in the mixture in relation to the equilibrium flash vaporization temperature at the bottom of the riser type cracker unit employed in the process. Still another proposal subjects the feed to a mild preliminary hydrocracking or hydrotreating operation before it is introduced into the cracking unit. It has also been suggested to contact a carbo-metallic oil such as reduced crude with hot taconite pellets to produce gasoline. This is a small sampling of the many proposals which have appeared in the patent literature and technical papers.

Notwithstanding the great effort which has been expended and the fact that each of these proposals overcomes some of the difficulties involved, conventional FCC practice today bears mute testimony to the dearth of carbo-metallic oil-cracking techniques that are both economical and highly practical in terms of technical feasibility. Some crude oils are relatively free of coke precursors or heavy metals or both, and the troublesome components of crude oil are for the most part concentrated in the highest boiling fractions. Accordingly, it has been possible to largely avoid the problems of coke precursors and heavy metals by sacrificing the liquid fuel yield which would be potentially available from the highest boiling fractions. More particularly, conventional FCC practice has employed as feedstock that fraction of crude oil which boils at about 343° C. to about 538° C. (650° F. to about 1000° F.), such fractions being relatively free of coke precursors and heavy metal contamination. Such feedstock, known as "vacuum gas oil" (VGO) is generally prepared from crude oil by distilling off the fractions boiling below about 343° C. (650° F.) at atmospheric pressure and then separating by further vacuum distillation from the heavier fractions a cut boiling between about 343° C. and about 482° C. to 552° C. (650° F. and about 900° F. to 1025° F.).

The vacuum gas oil is used as feedstock for conventional FCC processing. The heavier fractions are normally employed for a variety of other purposes, such as for instance production of asphalt, residual fuel oil, #6 fuel oils, or marine Bunker C fuel oil, which represents a great waste of the potential value of this portion of the crude oil, especially in light of the great effort and expense which the art has been willing to expend in the attempt to produce generally similar materials from coal and shale oils. The present invention is aimed at the simultaneous cracking of these heavier fractions containing substantial quantities of both coke precursors and heavy metals, and possibly other troublesome components, in conjunction with the lighter oils, thereby increasing the overall yield of gasoline and other hydrocarbon liquid fuels from a given quantity of crude. As indicated above, the present invention by no means constitutes the first attempt to develop such a process, but the long standing recognition of the desirability of cracking carbo-metallic feedstock, along with the slow progress of the industry toward doing so, show the continuing need for such a process. It is believed that the present process is uniquely advantageous for dealing with the problem of treating such carbo-metallic oils in an economically and technically sound manner.

One method of cracking these high boiling fractions, named Reduced Crude Conversion (RCC) after a particularly common and useful carbo-metallic feed, is disclosed in copending applications Ser. No. 94,092 now U.S. Pat. No. 4,332,673 and Ser. No. 94,216, now U.S. Pat. No. 4,341,624, each filed Nov. 14, 1979, for "Carbo-Metallic Oil Conversion" and each being incorporated herein by reference. The oils disclosed as capable of being cracked by the methods of these applications are carbo-metallic oils of which at least about 70 percent boils about 343° C. (650° F.) and which contain a carbon residue on pyrolysis of at least about 1 and at least about 4 parts per million of Nickel Equivalents of heavy metals.

In the performance of the above process, the abrupt separation of catalyst from product vapors and uncoverted feed (if any) has been found to be of great assistance. Not only is after cracking of products suppressed, but such abrupt separation is also beneficial from the standpoint of helping to control the coke laydown on catalyst, and consequently the heat load in the regenerator. For these reasons, the so-called vented riser apparatus disclosed in U.S. Pat. Nos. 4,070,159 and 4,066,533 to George D. Myers, Paul W. Walters and Robert L.

Cottage has been the preferred type of apparatus for conducting the RCC Process. It appears however that the foregoing benefits could be enhanced if an even more efficient and rapid technique for separation of catalyst from product vapors could be found, thus resulting in an improved version of the basic RCC Process. Such is the object of the present invention.

SUMMARY OF THE INVENTION

The present invention relates in part to the conversion of oil feeds comprising gas oils and residual oil feeds by thermal and catalytic conversion operations or a combustion thereof. In yet another aspect the invention relates to a method for separating suspensions of solid particulate material from gasiform material by establishing a momentum differential between solids and gasiform material in a suspension as discharged from a restricted diameter transport zone whereby ballistic separation is initiated and thereafter encouraging the separation by placing a zone of lower pressure adjacent to but external to the outlet of the restricted diameter transport zone for withdrawal of gasiform material. The solid particulate material may be catalyst particles, coal particles, particles of coke or substantially inert solid particles with respect to promoting or providing catalyst activity. The inert solids may be clay type solids, sand or other such materials. The gasiform material on the other hand may be hydrocarbon product gases and vapors of thermal and/or catalyst cracking of gas oils and residual oils, regeneration flue gases obtained by combustion of coke or carbonaceous deposits or one of more diluent or transport fluid materials such as steam, nitrogen, carbon dioxide, air, oxygen enriched gases and combinations thereof suitable for the purpose.

More particularly a method for converting oil feeds boiling above about 315° C. or 343° C. (600° F. or 650° F.) which may or may not comprise vacuum bottoms boiling above about 538° C. or about 552° C. (1000° F. or 1025° F.) with fluid catalysts particles and separation of a formed suspension in a limited time frame contributing to improving product selectivity is an important aspect of the invention. On the other hand, effecting thermal and/or catalytic cracking of high boiling residual oils comprising carbo-metallic component and employing the suspension separation technique of this invention is an important aspect of the overall combination of hydrocarbon conversion and solid particle regeneration to provide the heat requirement of the operation. Thus, regenerated solid particles, catalytic or inert, in combustion glue gases may be separated by the ballistic separation technique of this invention with vented cup.

In accordance with one particular aspect, heavy residual oils comprising metal contaminants and Conradson carbon components, and identified herein as a carbo-metallic heavy oil feed containing 343° C.+ (650° F.+) material is characterized by a carbon residue on pyrolysis of at least about 1 and by containing at least about 4 parts per million of Nickel Equivalents of heavy metal(s). Such residual feed is brought together with cracking catalyst particles to form a stream comprising a suspension of said particles in said feed in a progressive flow type reactor. This reactor includes an elongated reaction chamber and a disengagement chamber. The elongated reaction chamber comprises an outlet section having a longitudinal axis and is located at least in part within the disengagement chamber. There is an open downstream end in the outlet section which is located in the disengagement chamber. In accordance with the operating conditions of the RCC Process, the above mentioned stream is caused to flow in the elongated reaction chamber towards the downstream end of the said outlet section for a vapor residence time in the range of up to about 10 seconds at a temperature of about 482° C. to about 760° C. (900° F. to about 1400° F.) and under a total pressure of about 10 to about 50 pounds per square inch absolute. Such time, temperature and pressure are selected so as to be sufficient for causing a conversion per pass in the range of about 50% to about 90% while producing coke in amounts in the range of about 6 to about 14% by weight based on fresh feed, and laying down coke on the catalyst in amounts in the range of about 3% by weight.

According to the present invention, catalyst and product vapors in the above mentioned stream are discharged together from said elongated reaction zone through the downstream end of the above mentioned outlet section. At said downstream end, at least about 70%, preferably at least about 85%, and still more preferably at least about 90% by weight of the catalyst or solid particles are projected along one or more discharged paths having a component or components of motion in the downstream direction, based on the direction of motion of said stream in said outlet section. Such path or paths extend generally in the direction of a downstream extension of said outlet section axis and/or extend upon impingement upon a suitable surface in one or more directions divergent outwardly from said axis. Moreover, the product vapors are projected from the downstream end of the outlet section with solids as a stream or streams of lower momentum which diverge rapidly outwardly from the catalyst path or paths for withdrawal and recovery as discussed below.

The invention contemplates providing an impingement baffle or barrier wall downstream and spaced apart from the elongated reaction chamber outlet. There is obtained separation of catalyst solids from product vapors by projecting the catalyst in a direction established by the elongated reaction chamber while the vapors comprising cracked products of lesser momentum, are caused to separate from catalyst of higher momentum, resulting in a rather abrupt, ballistic separation of product vapors from catalyst. This abrupt separation is enhanced by withdrawing separated vapors into a zone of lower pressure. After stripping the catalyst to remove entrained hydrocarbons from the separated catalyst, the catalyst is regenerated with oxygen containing combustion-supporting gas under conditions of time, temperature and atmosphere sufficient to reduce the carbon on the catalyst to about 0.25 percent by weight or less, preferably about 0.1 percent by weight or less and still more preferably about 0.05 percent by weight or less, while forming combustion product gases comprising CO and/or $CO_2$. The regenerated catalyst may be separated from combustion flue gases by the ballistic separation technique herein discussed before being recycled to the elongated reaction chamber for contact with fresh residual oil feed.

If desired, the process may be operated with or without added hydrogen to the residual oil cracking reaction chamber. The cracking process may be operated without prior hydrotreating of the residual oil feed. On the other hand, some removal of asphaltenes or metal contaminants from the feed may be accomplished in a zone separate from the cracking zone with relatively inert solids. This is true even where the carbo-metallic oil as a whole contains more than about 4, or more than about 5 or even more than about 5.5 ppm Nickel Equivalents by weight of heavy metal and has a carbon residue on pyrolysis greater than about 1% or greater than about 2% by weight. Moreover, the residual oil or heavy oil feed may be thermally and catalytically cracked on a sequence of reaction zones provided with solids regeneration zones. The cracking reaction may be carried out with a catalyst which has previously been used (recycled, except for such replacement as required to compensate for normal losses and deactivation) to crack a carbo-metallic feed under the above described conditions. Heavy hydrocarbons not cracked to gasoline in a first pass may be recycled with or without hydrotreating for further cracking in contact with the same kind of feed in which they were first subjected to cracking conditions, and under the same kind of conditions; but operation in a substantially once-through or single pass mode (e.g. less than about 15% by volume of recycle based on volume of fresh feed) is preferred.

As noted above, the apparatus aspect of this invention has wide utility, which is by no means limited to hydrocarbon conversion processes, but can be aptly illustrated by its application to such processes. For example the separation apparatus in one of its embodiments includes an annular chamber at the outlet section of the elongated tubular member which functions as a product vapor recovery zone for the hydrocarbon cracking process. The annular chamber includes an outer wall spaced apart from the riser outlet section periphery to form a vapor collection zone for vapor flow passageway therebetween. The annular chamber open in its upper end also includes one or more vapor outlet passageways generally horizontally dispersed for transporting the vapor hydrocarbon conversion products from the annular collecting chamber. During operation, the hydrocarbon conversion products, under the influence of a negative pressure differential from the discharge of the tubular riser reaction zone rapidly exit to the interior of the outlet passageways while the momentum of the solid catalyst particles and dispersed thereof substantially prevents these particles from entering the annular chamber.

The open upper end of the annular chamber or lip thereof may be locatd in a zone extending from about 2D upstream to about even or slightly upstream the exit lip portion of the tubular riser reactor, wherein D constitutes the diameter of the exit lip portion. More preferably, the inlet to the annular chamber is just below the tubular riser member lip portion as shown in FIGS. 2 and 3.

While only one outlet conduit or passageway communicating with the annular chamber is shown in the drawings, a plurality of such separate outlet conduit may be employed. The riser outlet-annular chamber assembly herein discussed is enclosed within a larger diameter chamber dome shaped in an upper portion.

A target baffle may be positioned spaced apart and downstream from the discharge open end of the tubular riser reactor or contact zone. The target baffle is positioned substantially perpendicular to the direction of solids flow from the riser outlet. It may be spaced from $\frac{1}{2}$D to about 5D from the riser outlet lip portion.

The target baffle may be concave, convex or horizontal as desired. It is preferred that the target baffle be shaped to deflect solid particles away from entering the upper open end of the annular chamber section to increase the degree of solid-gas separation.

DISCUSSION OF THE SPECIFIC EMBODIMENTS

Figure 1:
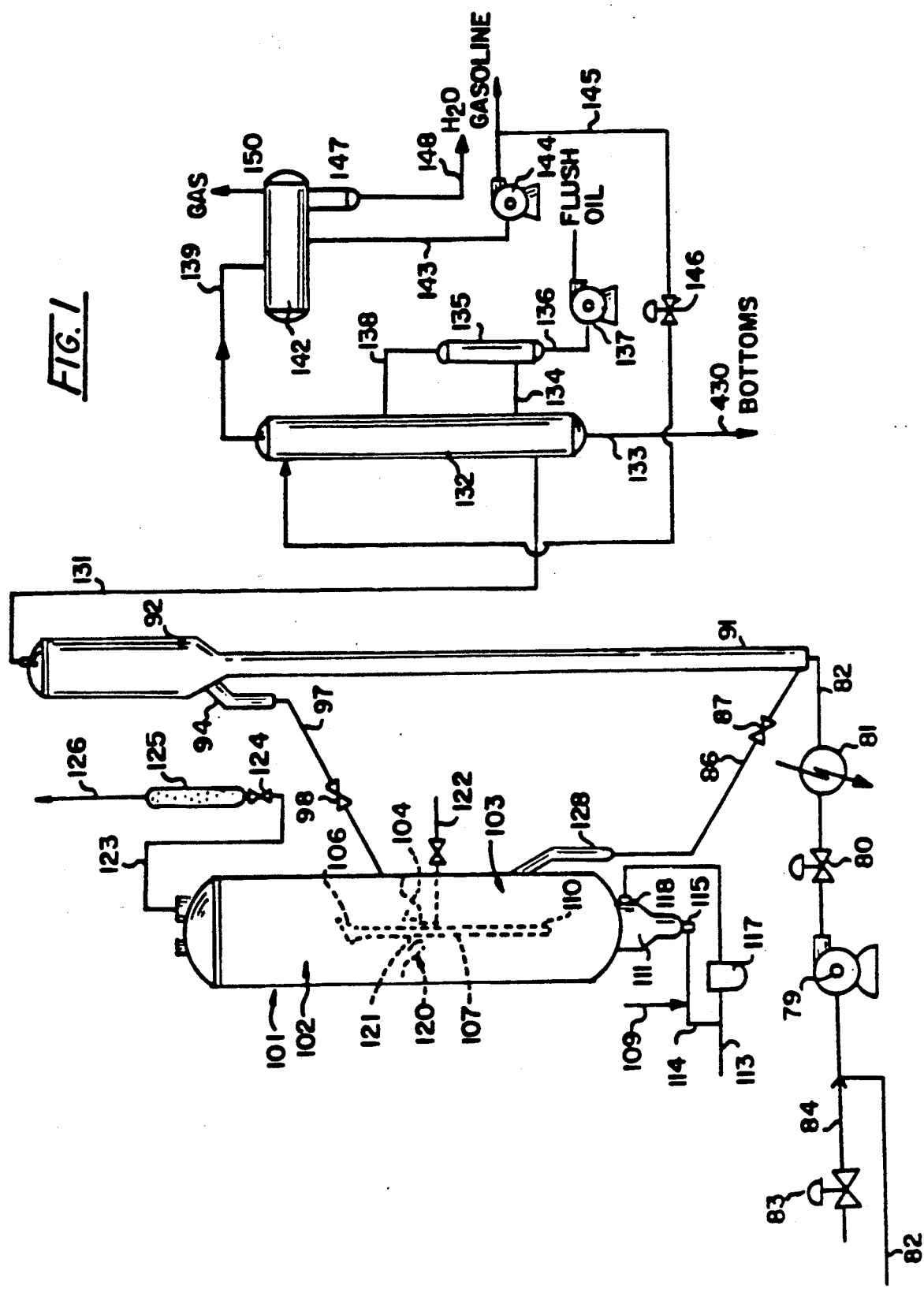
FIG. 1 is a schematic diagram of a reduced crude conversion unit for carrying out the process aspect of the present invention.

The present invention is applicable to virtually any fluidized gas/solids suspension separation desired. This includes fluid catalytic cracking operations and catalyst regeneration operations to separate flue gases from regenerated catalyst solids. It may be employed in processes employing catalytically inert solids such as fluid coking, metals removal systems for heavy residual oils and the like, the recovery of sand particles from sand filter systems and other such systems requiring separation of fluid solid particles from gasiform materials at relatively low and high temperatures. It is particularly useful in hydrocarbon conversion processes and related steps such as for instance FCC units used to crack gas oils and RCC units used to convert carbo-metallic oils to a variety of liquid products and regeneration of catalyst particles used in such processes. The present invention provides a process for the continuous catalytic conversion of a wide variety of carbo-metallic oils to lower molecular weight products, including highly valuable liquid products.

The invention may be applied to the processing of such widely diverse materials as residual oils, topped crude, heavy bottoms from crude oil, heavy bitumen containing crude oil, those crude oils known as "heavy crude" which approximate the properties of reduced crude, shale oil, tar sand extract, products from coal liquification and solvated coal, atmospheric and vacuum reduced crude, extracts and/or bottoms (raffinate) from solvent deasphalting, aromatic extract from lube oil refining, tar bottoms, heavy cycle oil, slop oil, other refinery waste streams and mixtures of the foregoing. Such mixtures can for instance be prepared by mixing available hydrocarbon fractions; including oils, tars, pitches and the like. Also, powdered coal may be suspended in the carbo-metallic oil. Persons skilled in the art are aware of techniques for demetalation of carbo-metallic oils, and demetalated oils may be converted using the invention; but process carbo-metallic oils that have had no prior demetalation treatment. Likewise, the invention can be applied to hydrotreated feedstocks. One preferred application of the process is for processing residual oils or a reduced crude, i.e., that fraction of crude oil initially boiling about 343° C. (650° F.), alone or in admixture with virgin gas oils. While the use of a feed material that has been subjected to prior vacuum distillation or inert solids treatment is not excluded, it can satisfactorily process material which has had no prior treatment, thus saving on capital investment and operating costs as compared to conventional FCC processes that require substantial prior feed treatment.

A 343° C. (650° F.) plus feed material converted in the riser discussed may have a carbon residue on pyrolysis of at least about 2 or greater. For example, the Conradson carbon content may be in the range of about 2 to about 12 and most frequently at least about 4. A particularly common range is about 4 to about 8. Those feeds having a Conradson carbon content greater than about 6 may require special treatment for controlling excess heat in the regenerator.

The carbo-metallic feeds converted as herein discussed, or at least the 343° C.+ (650° F.+) material, may contain at least about 4 parts per million of Nickel Equivalents, as defined above, of which at least about 2 parts per million is nickel (as metal, by weight). Carbo-metallic oils within the above range can be prepared from mixtures of two or more oils, some of which do and some of which do not contain the quantities of Nickel Equivalents and nickel set forth above. It should also be noted that the above values for Nickel Equivalents and nickel represent time-weighted averages for a substantial period of operation of the conversion unit, such as one month, for example. It should also be noted that the heavy metals have in certain circumstances exhibited some lessening of poisoning tendency after repeated oxidations and reductions on the catalyst, and the literature describes criteria for establishing "effective metal" values. For example, see the article by Cimbalo, et al, entitled "Deposited Metals Poison FCC Catalyst", *Oil and Gas Journal*, May 15, 1972, pp. 112-122, the contents of which are incorporated herein by reference.

It is known that about 0.2 to about 5 weight percent of "sulfur" in the form of elemental sulfur and/or its compounds (but reported as elemental sulfur based on the weight of feed) appears in FCC feeds and that the sulfur and modified forms of sulfur can find their way into the resultant gasoline product and, where lead is added, tend to reduce its susceptibility to octane enhancement. Sulfur in the product gasoline often requires sweetening when processing high sulfur containing crudes. To the extent that sulfur is present in the coke, it also represents a potential air pollutant since the generator burns it to $SO_2$ and $SO_3$. However, we have found that in our process the sulfur in the feed is on the other hand able to inhibit heavy metal activity by maintaining metals such as Ni, V, Cu and Fe in the sulfide form in the reactor. These sulfides are much less active than the metals themselves in promoting dehydrogenation and coking reactions. Accordingly, it is acceptable to carry out the invention with a carbo-metallic oil having at least about 0.3%, acceptably more than about 0.8% and more acceptably at least about 1.5% by weight of sulfur in the 343° C.+ (650° F.+) fraction.

The carbo-metallic oils useful in the invention may and usually do contain significant quantities of heavy, high boiling compounds containing nitrogen, a substantial portion of which may be basic nitrogen. For example, the total nitrogen content of the carbo-metallic oils may be at least about 0.05% by weight. Since cracking catalysts owe their cracking activity to acid sites on the catalyst surface or in its pores, basic nitrogen-containing compounds may temporarily neutralize these sites, poisoning the catalyst. However, the catalyst is not permanently damaged since the nitrogen can be burned off the catalyst during regeneration, as a result of which the acidity of the active sites is restored.

The carbo-metallic oils may also include significant quantities of pentane insolubles, for example at least about 0.5% by weight, and more typically 2% or more or even about 4% or more. These may include for instance asphaltenes and other materials.

Alkali and alkaline earth metals generally do not tend to vaporize in large quantities under the distillation conditions employed in distilling crude oil to prepare the vacuum gas oils normally used as FCC feedstocks. Rather, these metals remain for the most part in the "bottoms" fraction (the non-vaporized high boiling portion) which may for instance be used in the production of asphalt or other by-products. However, reduced crude and other carbo-metallic oils are in many cases bottoms products, and therefore may contain significant quantities of alkali and alkaline earth metals such as sodium. These metals deposit upon the catalyst during cracking. Depending on the composition of the catalyst and magnitude of the regeneration temperatures to which it is exposed, these metals may undergo interactions and reactions with the catalyst (including the catalyst support) which are not normally experienced in processing VGO under conventional FCC processing conditions. If the catalyst characteristics and regeneration conditions so require, one will of course take the necessary precautions to limit the amounts of alkali and alkaline earth metal in the feed, which metals may enter the feed not only as brine associated with the crude oil in its natural state, but also as components of water or steam which are supplied to the cracking unit. Thus, careful desalting of the crude used to prepare the carbo-metallic feed may be important when the catalyst is particularly susceptible to alkali and alkaline earth metals. In such circumstances, the content of such metals (hereinafter collectively referred to as "sodium") in the feed can be maintained at about 1 ppm or less, based on the weight of the feedstock. Alternatively, the sodium level of the feed may be keyed to that of the catalyst, so as to maintan the sodium level of the catalyst which is in use substantially the same as or less than that of the replacement catalyst which is charged to the unit.

According to a particularly preferred embodiment of the invention, the carbo-metallic oil feedstock constitutes at least about 70% by volume of material which boils above about 343° C. (650° F.), and at least about 10% of the material which boils above about 343° C. (650° F.) will not boil below about 552° C. (1026° F.). The average composition of this 343° C.+ (650° F.+) material may be further characterized by: (a) an atomic hydrogen to carbon ratio in the range of about 1.3 to about 1.8; (b) a Conradson carbon value of at least about 2; at least about four parts per million of Nickel Equivalents, as defined above, of which at least about two parts per million is nickel (as metal, by weight); and (d) at least one of the following: (i) at least about 0.3% by weight and sulfur, (ii) at least about 0.05% by weight of nitrogen, and (iii) at least about 0.5% by weight of pentane insolubles. Very commonly, the preferred feed will include all of (i), (ii), and (iii), and other components found in oils of petroleum and non-petroleum origin may also be present in varying quantities providing they do not prevent operation of the process.

Although there is no intention of excluding the possibility of using a feedstock which has previously been subjected to some cracking, the present invention has the definite advantage that it can successfully produce large conversions and very substantial yields of liquid hydrocarbon fuels from carbo-metallic oils which have not been subjected to any substantial amount of cracking. Thus, for example, and preferably; at least about 85%, more preferably at least about 90% and most preferably substantially all of the carbo-metallic feed introduced into the present process is oil which has not previously been contacted with cracking catalyst under cracking conditions. Moreover, the process of the invention is suitable for operation in a substantially once-through or single pass mode. Thus, the volume of recycle, if any, based on the volume of fresh feed is preferably about 15% or less and more preferably about 10% or less.

In general, the weight ratio of catalyst to fresh feed (feed which has not previously been exposed to cracking catalyst under cracking conditions) used in the process is in the range of about 3 to about 18. Preferred and more preferred ratios are about 4 to about 12, more preferably about 5 to about 10 and still more preferably about 6 to about 10, a ratio of about 10 presently being considered most nearly optimum. Within the limitations of product quality requirements, controlling the catalyst to oil ratio at relatively low levels within the aforesaid ranges tends to reduce the coke yield of the process, based on fresh feed.

In conventional FCC processing of VGO the ratio between the number of barrels per day of plant through-put and the total number of tons of catalyst undergoing circulation throughout all phases of the process can vary widely. For purposes of this disclosure, daily plant through-put is defined as the number of barrels of fresh feed boiling above about 343° C. (650° F.) which that plant processes per average day of operation to liquid products boiling below about 221° C. (430° F.).

The present invention may be practiced in the range of about 2 to about 30 tons of catalyst inventory per 1000 barrels of daily plant through-put. Based on the objective of maximizing contact of feed with fresh catalyst, it has been suggested that operating with about 2 to about 5 or even less than 2 tons of catalyst inventory per 1000 barrels of daily plant through-put is desirable when operating with carbo-metallic oils. However, in view of disclosures in "Deposited Metals Poison FCC Catalyst", Cimbalo, et. al., op ct., one may be able, at a given rate of catalyst replacement, to reduce effective metals levels on the catalyst by operating with a higher inventory, say in the range of about 12 to about 20 tons per 1000 barrels of daily through-put capacity.

In the practice of the invention, catalyst may be added continuously or periodically, such as, for example, to make up for normal losses of catalyst from the system. Moreover, catalyst addition may be conducted in conjunction with withdrawal of catalyst, such as, for example, to maintain or increase the average activity level of the catalyst in the unit. For example, the rate at which virgin catalyst is added to the unit may be in the range of about 0.1 to about 3, more preferably about 0.15 to about 2, and most preferably to about 0.2 to about 1.5 pounds per barrel of feed. If on the other hand equilibrium catalyst from FCC operation is to be utilized, replacement rates as high as about 5 pounds per barrel can be practiced.

Where circumstances are such that the catalyst employed in the unit is below average in resistance to deactivation and/or conditions prevailing in the unit are such as to promote more rapid deactivation, one may employ rates of addition greater than those stated above; but in the opposite circumstances, lower rates of addition may be employed. By way of illustration, if a unit were operated with a metal(s) loading of 5000 ppm Ni+V in parts by weight on equilibrium catalyst, one might for example employ a replacement rate of about 2.7 pounds of catalyst introduced for each barrel (42 gallons) of feed processed. However, operation at a higher level such as 10,000 ppm Ni+V on catalyst would enable one to substantially reduce the replacement rate, such as for example to about 1.3 pounds of catalyst per barrel of feed. Thus, the levels of metal(s) on the catalyst and catalyst replacement rates may in general be respectively increased and decreased to any value consistent with the catalyst activity which is available and desired for conducting the process.

Without wishing to be bound by any theory, it appears that a number of features of the process to be described in greater detail below, such as, for instance, the residual time and optional mixing of steam with the feedstock, tend to restrict the extent to which cracking conditions produce metals in the reduced state on the catalyst from heavy metal sulfide(s), sulfate(s) or oxide(s) deposited on the catalyst particles by prior exposures of carbo-metallic feedstocks and regeneration conditions. Thus, the process appears to afford significant control over the poisoning effect of heavy metals on the catalyst even when the accumulations of such metals are quite substantial.

Accordingly, the process may be practiced with catalyst bearing accumulations of heavy metal(s) in the form of elemental metal(s), oxide(s), sulfide(s) or other compounds which heretofore would have been considered quite intolerable in conventional FCC-VGO operations. Thus, operation of the process with catalyst bearing heavy metals accumulations in the range of about 3,000 or more ppm Nickel Equivalents, on the average, is contemplated. The concentration of Nickel Equivalents of metals on catalyst can range up to about 50,000 ppm or higher. More specifically, the accumulation may be in the range of about 3,000 to about 30,000 ppm, preferably in the range of 3,000 to 20,000 ppm, and more preferably about 3,000 to about 12,000 ppm. Within these ranges just mentioned, operation at metal levels of about 4,000 or more, about 5,000 or more, or about 7,000 or more ppm can tend to reduce the rate of catalyst replacement required. The foregoing ranges are based on parts per million of Nickel Equivalents, in which the metals are expressed as metal, by weight, measured on and based on regenerated equilibrium catalyst. However, in the event that catalyst of adequate activity is available at very low cost, making feasible very high rates of catalyst replacement, the carbo-metallic oil could be converted to lower boiling liquid products with catalyst bearing less than 3,000 ppm Nickel Equivalents of heavy metal. For example, one might employ equilibrium catalyst from another unit, for example, an FCC unit which has been used in the cracking of a feed, e.g. vacuum gas oil, having a carbon residue on pyrolysis of less than 1 and containing less than about 4 ppm Nickel Equivalents of heavy metals.

The invention concepts discussed in the present application may be employed in the following table of applications assigned to Ashland Oil, Inc.

| Ser. No. | Filed | U.S. Pat. No. | |
| --- | --- | --- | --- |
| 94091 | 11/14/79 | 4299687 | |
| 94092 | 11/14/79 | 4332673 | |
| 94216 | 11/14/79 | 4341624 | |
| 94217 | 11/14/79 | 4347122 | |
| 94277 | 11/14/79 | 4354923 | |
| 246751 | 03/23/81 | 4376696 | 03/15/83 |
| 246782 | 03/23/81 | 4375404 | 03/01/83 |

| Ser. No. | Filed | U.S. Pat. No. | |
|---|---|---|---|
| 246791 | 03/23/81 | 4376038 | 03/08/83 |

When very poor grades of residual oils are processed in a carbo-metallic conversion process, they often lead to uneconomical operations because of high heat loads imposed on the regenerator operation and/or require high catalyst addition rates to maintain adequate catalyst activity and/or selectivity. In order to improve the grade of very poor grades of oil, such as those containing more than 50 ppm heavy metals and/or more than 8 weight percent Conradson carbon and preferably more than 100 ppm heavy metals and/or more than 10 weight percent Conradson carbon, these oils may be pretreated with a sorbent material to reduce the level of these contaminants to aforementioned lower values. An upgrading process suitable for this purpose is described in U.S. Pat. No. 4,263,128 of Apr. 21, 1981, in the name of David B. Bartholic, the entire disclosure of said patent being incorporated herein by reference.

In any event, the equilibrium concentration of heavy metals in the circulating inventory of catalyst can be controlled (including maintained or varied as desired or needed) by manipulation of the rate of catalyst addition discussed above. Thus, for example, addition of catalyst may be maintained at a rate which will control the heavy metals accumulation on the catalyst in one of the ranges set forth above.

In general, it is preferred to employ a catalyst having a relatively high level of cracking activity, providing high levels of conversion and productivity at low residence times. The conversion capabilities of the catalyst may be expressed in terms of the conversion produced during actual operation of the process and/or in terms of conversion produced in standard catalyst activity tests. For example, is is preferred to employ catalyst which, in the course of extended operation under prevailing process conditions, is sufficiently active for sustaining a level of conversion of at least about 50% and more preferably at least about 60%. In this connection, conversion is expressed in liquid volume percent, based on fresh feed.

Also, for example, the preferred catalyst may be defined as one which, in its virgin or equilibrium state, exhibits a specified activity expressed as a percentage in terms of MAT (micro-activity test) conversion. For purposes of the present invention the foregoing percentage is the volume percentage of standard feedstock which a catalyst under evaluation will convert to 221° C. 430° F.) end point gasoline, light products and coke at 482° C. (900° F.), 16 WHVS (weight hourly space velocity, calculated on a moisture free basis, using clean catalyst which has been dried at 593° C. (1100° F.), weighed and then conditioned, for a period of at least 8 hours at about 25° C. and 50% relative humidity, until about one hour or less prior to contacting the feed) and 3C/O (catalyst to oil weight ratio) by ASTM D-32 MAT test D-3907-80, using an appropriate standard feedstock, e.g. a sweet light primary gas oil, such as that used by Davison, Division of W. R. Grace, having the following analysis and properties:

| API Gravity at 16° C. (60° F.), degrees | 31.0 |
|---|---|
| Specific Gravity at 16° C. (60° F.), g/cc | 0.8708 |
| Ramsbottom Carbon, wt. % | 0.09 |
| Conradson Carbon, wt. % | 0.04 |
| Carbon, wt. % | 84.92 |
| Hydrogen, wt. % | 12.94 |
| Sulfur, wt. % | 0.68 |
| Nitrogen, ppm | 305 |
| Viscosity at 38° C. (100° F.), centistokes | 10.36 |
| Aniline Point & | 182 Watson K Factor |
| 11.93 | |
| Bromine No. | 2.2 |
| Paraffins, Vol. % | 31.7 |
| Olefins, Vol. % | 1.6 |
| Naphthenes, Vol. % | 44.0 |
| Aromatics, Vol. % | 22.7 |
| Average Molecular Weight | 284 |
| Nickel | Trace |
| Vanadium | Trace |
| Iron | Trace |
| Sodium | Trace |
| Chlorides | Trace |
| B S & W | Trace |
| Distillation | ASTM D-1160 |
| IBP | 445 |
| 10% | 601 |
| 30% | 664 |
| 50% | 701 |
| 70% | 734 |
| 90% | 787 |
| FBP | 834 |

The gasoline end point and boiling temperature-volume percent relationships of the product produced in the MAT conversion test may for example be determined by simulated distillation techniques, for example modifications of gas chromate graphic "Sim-D", ASTM D-2887-73. The results of such simulations are in reasonable agreement with the results obtained by subjecting larger samples of material to standard laboratory distillation techniques. Conversion is calculated by subtracting from 100 the volume percent (based on fresh feed) of those products heavier than gasoline which remain in the recovered product.

On pages 935-937 of Hougen and Watson, *Chemical Process Principles*, John Wiley & Sons, Inc. New York (1947), the concept of "Activity Factors" is discussed. This concept leads to the use of "relative activity" to compare the effectiveness of an operating catalyst against a standard catalyst. Relative activity measurements facilitate recognition of how the quantity requirements of various catalysts differ from one another. Thus, relative activity is a ratio obtained by dividing the weight of a standard or reference catalyst which is or would be required to produce a given level of conversion, as compared to the weight of an operating catalyst (whether proposed or actually used) which is or would be required to produce the same level of conversion in the same or equivalent feedstock under the same or equivalent conditions. Said ratio of catalyst weights may be expressed as a numerical ratio, but preferably is converted to a percentage basis. The standard catalyst is preferably chosen from among catalyst useful for conducting the present invention, such as for example zeolite fluid cracking catalysts, and is chosen for its ability to produce a predetermined level of conversion in a standard feed under the conditions of temperature, WHSV, catalyst to oil ratio and other conditions set forth in the preceding description of the MAT conversion test and in ASTM D-32 MAT test D-3907-80. Conversion is the volume percentage of feedstock that is converted to 221° C. (430° F.) end point gasoline, lighter products and coke. For standard feed, one may employ the above-mentioned light primary gas oil, or equivalent.

For purposes of conducting relative activity determinations, one may prepare a "standard catalyst curve", a chart or graph of conversion (as above defined) vs. reciprocal WHSV for the standard catalyst and feedstock. A sufficient number of runs is made under ASTM D-3907-80 conditions (as modified above) using standard feedstock at varying levels of WHSV to prepare an accurate "curve" of conversion vs. WHSV for the standard feedstock. This curve should traverse all or substantially all of the various levels of conversion including the range of conversion within which it is expected that the operating catalyst will be tested. From this curve, one may establish a standard WHSV for test comparisons and a standard value of reciprocal WHSV corresponding to that level of conversion which has been chosen to represent 100% relative activity in the standard catalyst. For purposes of the present disclosure the aforementioned reciprocal WHSV and level of conversion are, respectively, 0.0625 and 75%. In testing an operating catalyst of unknown relative activity, one conducts a sufficient number of runs with that catalyst under D-3907-80 conditions (as modified above) to establish the level of conversion which is or would be produced with the operating catalyst at standard reciprocal WHSV. Then, using the above-mentioned standard catalyst curve, one establishes a hypothetical reciprocal WHSV constituting the reciprocal WHSV which would have been required, using the standard catalyst, to obtain the same level of conversion which was or would be exhibited, by the operating catalyst at standard WHSV. The relative activity may then be calculated by dividing the hypothetical reciprocal WHSV by the reciprocal standard WHSV, which is 1/16, or 0.0625. The result is relative activity expressed in terms of a decimal fraction, which may then be multiplied by 100 to convert to percent relative activity. In applying the results of this determination, a relative activity of 0.5, or 50%, means that it would take twice the amount of the operating catalyst to give the same conversion as the standard catalyst, i.e., the production catalyst is 50% as active as the reference catalyst.

The catalyst may be introduced into the process in its virgin form or, as previously indicated, in other than virgin form; e.g. one may use equilibrium catalyst withdrawn from another unit, such as catalyst that has been employed in the cracking of a different feed. Whether characterized on the basis of MAT conversion activity or relative activity, the preferred catalysts may be described on the basis of their activity "as introduced" into the process of the present invention, or on the basis of their "as withdrawn" or equilibrium activity in the process of the present invention, or on both of these bases. A preferred activity level of virgin and non-virgin catalyst "as introduced" into the process of the present invention is at least about 60% by MAT conversion, and preferably at least about 20%, more preferably at least about 40% and still more preferably at least about 60% in terms of relative activity. However, it will be appreciated that, particularly in the case of non-virgin catalysts supplied at high addition rates, lower activity levels may be acceptable. An acceptable "as withdrawn" or equilibrium activity level of catalyst which has been used in the process of the present invention is at least about 20% or more, but about 40% or more and preferably about 60% or more are preferred values on a relative activity basis, and an activity level of 60% or more on a MAT conversion basis is also contemplated. More preferably, it is desired to employ a catalyst which will, under the conditions of use in the unit, establish an equilibrium activity at or above the indicated level. The catalyst activities are determined with catalyst having less than 0.01 coke, e.g. regenerated catalyst.

One may employ any hydrocarbon cracking catalyst having the above indicated conversion capabilities. A particularly preferred class of catalysts includes those which have pore structures into which molecules of feed material may enter for adsorption and/or contact with active catalytic sites within or adjacent the pores. Various types of catalysts are available within this classification, including for example the layered silicates, e.g. smectites. Although the most widely available catalysts within this classification are the well-known zeolite-containing catalysts, non-zeolite catalysts are also contemplated.

The preferred zeolite-containing catalysts may include any zeolite, whether natural, semi-synthetic or synthetic, alone or in admixture with other materials which do not significantly impair the suitability of the catalyst, provided the resultant catalyst has the activity and pore structure referred to above. For example, if the virgin catalyst is a mixture, it may include the zeolite component associated with or dispersed in a porous refractory inorganic oxide carrier, in such case the catalyst may for example contain about 1% to about 60%, more preferably about 15 to about 50%, and most typically about 20 to about 45% by weight, based on the total weight of catalyst (water free basis) of the zeolite, the balance of the catalyst being the porous refractory inorganic oxide alone or in combination with any of the known adjuvants for promoting or suppressing various desired and undesired reactions. For a general explanation of the genus of zeolite, molecular sieve catalysts useful in the invention, attention is drawn to the disclosures of the articles entitled "Refinery Catalysts Are a Fluid Business" and "Making Cat Crackers Work On Varied Diet", appearing respectively in the July 26, 1978 and Sept. 13, 1978 issues of Chemical Week magazine. The descriptions of the aforementioned publications are incorporated herein by reference.

For the most part, the zeolite components of the zeolite-containing catalysts will be those which are known to be useful in FCC cracking processes. In general, these are crystalline aluminosilicates, typically made up of tetra coordinated aluminum atoms associated through oxygen atoms with adjacent silicon atoms in the crystal structure. However, the term "zeolite" as used in this disclosure contemplates not only aluminosilicates, but also substances in which the aluminum has been partly or wholly replaced, such as for instance by gallium and/or other metal atoms, and further includes substances in which all or part of the silicon has been replaced, such as for instance by germanium. Titanium and zirconium substitution may also be practiced.

Most zeolites are prepared or occur naturally in the sodium form, so that sodium cations are associated with the electro-negative sites in the crystal structure. The sodium cations tend to make zeolites inactive and much less stable when exposed to hydrocarbon conversion conditions, particularly high temperatures. Accordingly, the zeolite may be ion exchanged, and where the zeolite is a component of a catalyst composition, such ion exchanging may occur before or after incorporation of the zeolite as a component of the composition. Suitable cations for replacement of sodium in the zeolite crystal structure include ammonium (decomposable to hydrogen), hydrogen, rare earth metals, alkaline earth metals, etc. Various suitable ion exchange procedures and cations which may be exchanged into the zeolite crystal structure are well known to those skilled in the art.

Examples of the naturally occurring crystalline aluminosilicate zeolites which may be used as or included in the catalyst for the present invention are faujasite, mordenite, clinoptilote, chabazite, analcite, crionite, as well as levynite, dachiardite, paulingite, noselite, ferriorite, heulandite, scolccite, stibite, harmotome, phillipsite, brewsterite, flarite, datolite, gmelinite, caumnite, leucite, lazurite, scaplite, mesolite, ptolite, nephline, matrolite, offretite and sodalite.

Examples of the synthetic crystalline aluminosilicate zeolites which are useful as or in the catalyst for carrying out the present invention are Zeolite X, U.S. Pat. No. 2,882,244; Zeolite Y, U.S. Pat. No. 3,130,007; and Zeolite A, U.S. Pat. No. 2,882,243; as well as Zeolite B, U.S. Pat. No. 3,008,803; Zeolite D, Canada Patent No. 661,981; Zeolite E, Canada Patent No. 614,495; Zeolite F, U.S. Pat. No. 2,996,358; Zeolite H, U.S. Pat. No. 3,010,789; Zeolite J, U.S. Pat. No. 3,011,869; Zeolite L, Belgian Patent No. 575,177; Zeolite M, U.S. Pat. No. 2,995,423; Zeolite O, U.S. Pat. No. 3,140,252; Zeolite Q, U.S. Pat. No. 2,991,151; Zeolite S, U.S. Pat. No. 3,054,657; Zeolite T, U.S. Pat. No. 2,950,952; Zeolite W, U.S. Pat. No. 3,013,853; Zeolite Z, Canada Patent No. 614,495; and Zeolite Omega, Canada Patent No. 817,915. Also, ZK-4HJ, alpha beta and ZSM-type zeolites are useful. Moreover, the zeolites described in U.S. Pat. Nos. 3,140,249; 3,140,253; 3,944,482; and 4,137,151 are also useful. The disclosures of said patents being incorporated herein by reference.

The crystalline aluminosilicate zeolites having a faujasite-type crystal structure are particularly preferred for use in the present invention. This includes particularly natural faujasite and Zeolite X and Zeolite Y.

The crystalline aluminosilicate zeolites, such as synthetic faujasite, will under normal conditions crystallize as regularly shaped, discrete particles of about one to about ten microns in size, and, accordingly, this is the size range frequently found in commercial catalysts which can be used in the invention. Preferably, the particle size of the zeolites is from about 0.1 to about 10 microns and more preferably is from about 0.1 to about 2 microns or less. For example, zeolites prepared in situ from calcined kaolin may be characterized by even smaller crystallites. Crystalline zeolites exhibit both an interior and an exterior surface area, the latter being defined as "portal" surface area, with the largest portion of the total surface area being internal. By portal surface area, we refer to the outer surface of the zeolite crystal through which reactants are considered to pass in order to convert to lower boiling products. Blockages of the internal channels by, for example, coke formation, blockages of entrance to the internal channels by deposition of coke in the portal surface area, and contamination by metals poisoning, will greatly reduce the total zeolite surface area. Therefore, to minimize the effect of contamination and pore blockage, crystals larger than the normal size cited above are preferably not used in the catalyst of this invention.

Commercial zeolite-containing catalysts are available with carrier containing a variety of metal oxides and combination thereof, include for example silica, alumina, magnesia, and mixtures thereof and mixtures of such oxides with clays. One may for example select any of the zeolite-containing molecular sieve fluid cracking catalysts which are suitable for production of gasoline from vacuum gas oils. However, certain advantages may be attained by judicious selection of catalysts having marked resistance to metals. A metal resistance zeolite catalyst is, for instance, described in U.S. Pat. No. 3,944,482, in which the catalyst contains 1-40 weight percent of a rare earth-exchanged zeolite, the balance being a refractory metal oxide having specified pore volume and size distribution. Other catalysts described as "metal-tolerant" are described in the above mentioned Cimbala, et al., article.

In general, it is preferred to employ catalysts having an overall particle size in the range of about 5 to about 160, more preferably about 40 to about 120, and most preferably about 40 to about 80 microns. For example, a useful catalyst may have a skeletal density of about 150 pounds per cubic foot and an average particle size of about 60-70 microns, with less than 10% of the particles having a size less than about 40 microns and less than 80% having a size less than about 50-60 microns.

Although a wide variety of other catalysts, including both zeolite-containing and non-zeolite-containing may be employed in the practice of the invention, the following are examples of commercially available catalysts which may be employed in practicing the invention:

TABLE 1

| | Specific Surface $m^2/g$ | Weight Percent | | | | | |
|---|---|---|---|---|---|---|---|
| | | Zeolite Content | $Al_2O_3$ | $SiO_2$ | $Na_2O$ | $Fe_2O$ | $TiO_2$ |
| AGZ-290 | 300 | 11.0 | 29.5 | 59.0 | 0.40 | 0.11 | 0.59 |
| GRZ-1 | 162 | 14.0 | 23.4 | 69.0 | 0.10 | 0.4 | 0.9 |
| CCZ-220 | 129 | 11.0 | 34.6 | 60.0 | 0.60 | 0.57 | 1.9 |
| Super DX | 155 | 13.0 | 31.0 | 65.0 | 0.80 | 0.57 | 1.6 |
| F-87 | 240 | 10.0 | 44.0 | 50.0 | 0.80 | 0.70 | 1.6 |
| FOX-90 | 240 | 8.0 | 44.0 | 52.0 | 0.65 | 0.65 | 1.1 |
| HFZ 20 | 310 | 20.0 | 59.0 | 40.0 | 0.47 | 0.54 | 2.75 |
| HEZ 55 | 210 | 19.0 | 59.0 | 35.2 | 0.60 | 0.60 | 2.5 |

The AGZ-290, GRZ-1, CCZ-220 and Super DX catalysts referred to above are products of W. R. Grace and Co. F-87 and FOC-90 are products of Filtrol, while HFZ-20 and HEZ-55 are products of Engelhard/Houdry. The above are properties of virgin catalyst and, except in the case of zeolite content, are adjusted to a water free basis, i.e. based on material ignited at 940° C. (1750° F.). The zeolite content is derived by comparison of the X-ray intensities of a catalyst sample and of a standard material composed of high purity sodium Y zeolite in accordance with draft #6, dated Jan. 9, 1978, of proposed ASTM Standard Method entitled "Determination of the Faujasite Content of a Catalyst".

Among the above mentioned commercially available catalysts, the Super D family and especially a catalyst designated GRZ-1 are particularly preferred. For example, Super DX has given particularly good results with Arabian light crude. The GRZ-1, although substantially more expensive than the Super DX at present, appears somewhat more metals-tolerant.

It is believed that best catalysts for carrying out the present invention are those which are characterized by matrices with feeder pores having large minimum diameters and large mouths to facilitate diffusion of high molecular weight molecules through the matrix to the portal surface area of molecular sieve particles within the matrix. Such matrices preferably also have a relatively large pore volume in order to soak up unvaporized portions of the carbo-metallic oil feed. Thus significant numbers of liquid hydrocarbon molecules can diffuse to active catalytic sites both in the matrix and in sieve particles on the surface of the matrix. In general it is preferred to employ catalysts having a total pore volume greater than 0.2 cc/gm, preferably at least 0.4 cc/gm, more preferably at least 0.6 cc/gm and most preferably in the range of 0.7 to 1.0 cc/gm, and with matrices wherein at least 0.1 cc/gm, and preferably at least 0.2 cc/gm, of said total pore volume is comprised of feeder pores having diameters in the range of about 400 to about 6000 angstrom units, more preferably in the range of about 1000 to about 6000 angstrom units. These catalysts and the method for making it the same are described more fully in copending international application Serial No. PCT/US81/00492 filed in the U.S. Receiving Office Apr. 10, 1981, in the names of Ashland Oil, Inc., et. al., and entitled "Large Pore Catalysts for Heavy hydrocarbon Conversion", the entire disclosure of said application being incorporated herein by reference.

Catalysts for carrying out the present invention may also employ other metal additives for controlling the adverse effects of vanadium as described in PCT International Application Serial No. PCT/US81/00356 filed in the U.S. Receiving Office on Mar. 19, 1981, in the names of Ashland Oil, Inc, et al., and entitled "Immobilization of Vanadia Deposited on Catalytic Materials During Carbo-Metallic Oil Conversion". The manner in which these other metal additives are believed to interact with vanadium is set forth in said PCT international application, the entire disclosure of which is incorporated herein by reference. Certain of the additive metal compounds disclosed in this referenced PCT application, particularly those of titanium and zirconium, will also passivate nickel, iron and copper. The passivating mechanism of titanium and zirconium on nickel, iron and copper is believed to be similar to that of aluminum and silicon, namely, an oxide and/or spinel coating may be formed. Where the additive is introduced directly into the conversion process, that is into the riser, into the regenerator or into any intermediate components, the additive is preferably an organo-metallic compound of titanium or zirconium soluble in the hydrocarbon feed or in a hydrocarbon solvent miscible with the feed. Examples of preferred organo-metallic compounds of these metals are tetraisopropyl-titanate, TI $(C_3H_7O)_4$, available as TYZOR from the DuPont Company; zirconium isopropoxide, Zr $(C_3H_7O)_4$; and zirconium 2,4-pentanedionate - Zr $(C_5H_7O_2)_4$. These organo-metallics are only a partial example of the various types available and others would include alcoholates, esters, phenolates, naphthenates, carboxylates, dienyl samdwich compounds, and the like. Other preferred process additives include titanium tetrachloride, zirconium tetrachloride and zirconium acetate, and the water soluble inorganic salts of these metals, including the sulfates, nitrates and chlorides, which are relatively inexpensive.

Because the atomic weight of zirconium differs relative to the atomic weights of nickel and vanadium, while that of titanium is about the same, a 1:1 atomic ratio is equivalent to about a 1.0 weight ratio of titanium to nickel plus vanadium, and to about a 2.0 weight ratio of zirconium to nickel plus vanadium. Multiples of the 1:1 atomic ratio require the same multiple of the weight ratio. For example a 2:1 atomic ratio requires about a 2.0 titanium weight ratio and about a 4.0 zirconium weight ratio.

Additives may be introduced into the riser, the regenerator or other conversion system components to passivate the non-selective catalytic activity of heavy metals deposited on the conversion catalyst. Preferred additives for practicing the present invention include those disclosed in U.S. Pat. No. 4,454,025 in the name of William P. Hettinger, Jr., and entitled PASSIVATING HEAVY METALS IN CARBO-METALLIC OIL CONVERSION, the entire disclosure of said U.S. Patent being incorporated herein by reference.

A particularly preferred catalyst also includes vanadium traps as disclosed in U.S. patent application Ser. No. 252,967 filed Apr. 10, 1981 now abandoned, in the name of William P. Hettinger, et al., and entitled "Trapping of Metals Deposited on Catalytic Materials During Carbo-Metallic Oil Conversion". It is also preferred to control the valence state of vanadium accumulations on the catalyst during regeneration as disclosed in pending U.S. patent application Ser. No. 255,931 filed Apr. 20, 1981, entitled "Immobilization of Vanadium Deposited on Catalytic Materials During Carbo-Metallic Oil Conversion" filed in the name of William P. Hettinger, J., et al., on Apr. 20, 1981, as well as U.S. Pat. No. 4,377,470. The entire disclosures of said U.S. patent applications and Patent are incorporated herein by reference.

It is considered an advantage that the process of the present invention can be conducted in the substantial absence of tin and/or antimony or at least in the presence of a catalyst which is substantially free of either or both of these metals.

The process of the present invention may be operated with the above described carbo-metallic oil and catalyst as substantially the sole materials charged to the reaction zone, although charging of additional materials is not excluded. The charging of recycled oil to the reaction zone has already been mentioned. As described in greater detail below, still other materials fulfilling a variety of functions may also be charged. In such case, the carbo-metallic oil and catalyst usually represent the major proportion by weight of the total of all materials charged to the reaction zone.

Certain of the additional materials which may be used perform functions which offer significant advantages over the process as performed with only the carbo-metallic oil and catalyst. Among these functions are: controlling the effects of heavy metals and other catalyst contaminants; enhancing catalyst activity; absorbing excess heat in the catalyst as received from the regenerator; disposal of pollutants or conversion thereof to a form or forms in which they may be more readily separated from products and/or disposed of; controlling catalyst temperature; diluting the carbo-metallic oil vapors to reduce their partial pressure and increase the yield of desired products; adjusting feed/catalyst contact time; donation of hydrogen to a hydrogen deficient carbo-metallic oil feedstock for example as disclosed in U.S. Pat. No. 4,376,038 entitled "Use of Naphtha in Carbo-Metallic Oil Conversion", filed in the name of George D. Myers on Mar. 23, 1981, which patent is incorporated herein by reference; assisting in the dispersion of the feed; and possibly also distillation of products. Certain of the metals in the heavy metals accumulation on the catalyst are more active in promoting undesired reactions when they are in the form of elemental metal, than they are when in the oxidized form produced by contact with oxygen in the catalyst regenerator. However, the time of contact between catalyst and vapors of feed and product in past conventional catalytic cracking was sufficient so that hydrogen released in the cracking reaction was able to reconvert a significant portion of the less harmful oxides back to the more harmful elemental heavy metals. One can take advantage of this situation through the introduction of additional materials which are in gaseous (including vaporous) form in the reaction zone in admixture with the catalyst and vapors of feed and products. The increased volume of material in the reaction zone resulting from the presence of such additional materials tend to increase the velocity of flow through the reaction zone with a corresponding decrease in the residence time of the catalyst and oxidized heavy metals borne thereby. Because of this reduced residence time, there is less opportunity for reduction of the oxidized heavy metals to elemental form and therefore less of the harmful elemental metals are available for contacting the feed and products.

Added materials may be introduced into the process in any suitable fashion, some examples of which follow. For instance, they may be admixed with the carbo-metallic oil feedstock prior to contact of the latter with the catalyst. Alternatively, the added materials may, if desired, be admixed with the catalyst prior to contact of the latter with the feedstock. Separate portions of the added materials may be separately admixed with both catalyst and carbo-metallic oil. Moreover, the feedstock, catalyst and additional materials may, if desired, be brought together substantially simultaneously. A portion of the added materials may be mixed with catalyst and/or carbo-metallic oil in any of the above described ways, while additional portions are subsequently brought into admixture. For example, a portion of the added materials may be added to the carbo-metallic oil and/or to the catalyst before they reach the reaction zone, while another portion of the added materials is introduced directly into the reaction zone. The added materials may be introduced at a plurality of spaced locations in the reaction zone or along the length thereof, if elongated.

The amount of additional materials which may be present in the feed, catalyst or reaction zone for carrying out the above functions, and others, may be varied as desired; but said amount will preferably be sufficient to substantially heat balance the process. These materials may for example be introduced into the reaction zone in a weight ratio relative to feed of up to about 0.4, preferably in the range of about 0.02 to about 0.4, more preferably about 0.03 to about 0.3 and most preferably about 0.05 to about 0.25.

For example, many or all of the above desirable functions may be attained by introducing $H_2O$ to the reaction zone in the form of steam or of liquid water or a combination thereof in a weight ratio relative to feed in the range of about 0.04 or more, or more preferably about 0.05 to about 0.1 or more. Without wishing to be bound by any theory, it appears that the use of $H_2O$ tends to inhibit reduction of catalyst-borne oxides, sulfites and sulfides to the free metallic form which is believed to promote condensation-dehydrogenation with consequent promotion of coke and hydrogen yield and accompanying loss of product. Moreover, $H_2O$ may also, to some extent, reduce deposition of metals onto the catalyst surface. There may also be some tendency to desorb nitrogen-containing and other heavy contaminant-containing molecules from the surface of the catalyst particles, or at least some tendency to inhibit their absorption by the catalyst. It is also believed that added $H_2O$ tends to increase the acidity of the catalyst by Bronsted acid formation which in turn enhances the activity of the catalyst. Assuming the $H_2O$ as supplied is cooler than the regenerated catalyst and/or the temperature of the reaction zone, the sensible heat involved in raising the temperature of the $H_2O$ upon contacting the catalyst in the reaction zone or elsewhere can absorb excess heat from the catalyst. Where the $H_2O$ is or includes recycled water that contains for example about 500 to about 5000 ppm of $H_2S$ dissolved therein, a number of additional advantages may accrue. The ecologically unattractive $H_2S$ need not be vented to the atmosphere, the recycled water does not require further treatment to remove $H_2S$ and the $H_2S$ may be of assistance in reducing coking of the catalyst by passivation of the heavy metals, i.e. by conversion thereof to the sulfide form which has a lesser tendency than the free metals to enhance coke and hydrogen production. In the reaction zone, the presence of $H_2O$ can dilute the carbo-metallic oil vapors, thus reducing their partial pressure and tending to increase the yield of the desired products. It has been reported that $H_2O$ is useful in combination with other materials in generating hydrogen during cracking; thus it may be able to act as a hydrogen donor for hydrogen deficient carbo-metallic oil feedstocks. The $H_2O$ may also serve certain functions such as: assisting in the atomizing or dispersion of the feed; competing with high molecular weight molecules for adsorption on the surface of the catalyst, thus interrupting coke formation; steam distillation of vaporizable product from unvaporized feed material; and disengagement of product from catalyst upon conclusion of the cracking reaction. It is particularly preferred to bring together $H_2O$, catalyst and carbo-metallic oil substantially simultaneously. For example, one may admix $H_2O$ and feedstock in an atomizing nozzle and immediately direct the resultant spray into contact with the catalyst at the downstream end of the reaction zone.

The addition of steam to the reaction zone is frequently mentioned to the literature of fluid catalytic cracking. Addition of liquid water to the feed is discussed relatively infrequently, compared to the introduction of steam directly into the reaction zone. However, in accordance with the present invention it is particularly preferred that liquid water be brought into intimate admixture with the carbo-metallic oil in a weight ratio of about 0.04 to about 0.25 at or prior to the time of introduction of the oil into the reaction zone, whereby the water (e.g., in the form of liquid water or in the form of steam produced by vaporization of liquid water in contact with the oil) enters the reaction zone as part of the flow of feedstock which enters such zone.

Although not wishing to be bound by any theory, it is believed that the foregoing is advantageous in promoting dispersion of the feedstock. Also, the heat of vaporization of the water, which heat is absorbed from the catalyst, from the feedstock, or from both, causes the water to be a more efficient heat sink than steam alone. Preferably the weight ratio of liquid water to feed is about 0.04 to about 0.2, more preferably about 0.05 to about 0.15.

Of course, the liquid water may be introduced into the process in the above described manner or in other ways, and in either event the introduction of liquid water may be accompanied by the introduction of additional amounts of water as steam into the same or different portions of the reaction zone or into the catalyst and/or feedstock. For example, the amount of additional steam may be in a weight ratio relative to feed in the range of about 0.01 to about 0.25, with the weight ratio of total $H_2O$ (as steam and liquid water) to feedstock being about 0.3 or less. The charging weight ratio of liquid water relative to steam in such combined use of liquid water and steam may for example range from about 15 which is presently preferred, to about 0.2. Such ratio may be maintained at a predetermined level within such range or varied as necessary or desired to adjust or maintain heat balance.

Other materials may be added to the reaction zone to perform one or more of the above described functions. For example, the dehydrogenation-condensation activity of heavy metals may be inhibited by introducing hydrogen sulfide gas into the reaction zone. Hydrogen may be made available for hydrogen deficient carbo-metallic oil feedstocks by introducing into the reaction zone either a conventional hydrogen donor diluent such as a heavy naphtha or relatively low molecular weight carbon-hydrocarbon fragment contributors, including for example: light paraffins; low molecular weight alcohols and other compounds which permit or favor intermolecular hydrogen transfer; and compounds that chemically combine to generate hydrogen in the reaction zone such as by reaction of carbon monoxide with water, or with alcohols, or with olefins, or with other materials or mixtures of the foregoing.

All of the above mentioned additional materials (including water), alone or in conjunction with each other or in conjunction with other materials, such as nitrogen or other inert gases, light hydrocarbons, and others, may perform any of the above-described functions for which they are suitable, including without limitation, acting as diluents to reduce feed partial pressure and/or as heat sinks to absorb excess heat present in the catalyst as received from the regeneration step. The foregoing is a discussion of some of the functions which can be performed by materials other than catalyst and carbo-metallic oil feedstock introduced into the reaction zone, and it should be understood that other materials may be added or other functions performed without departing from the spirit of the invention.

The invention may be practiced in a wide variety of apparatus. However, the preferred apparatus includes means for rapidly vaporizing as much feed as possible and efficiently admixing feed and catalyst (although not necessarily in that order), for causing the resultant mixture to flow as a dilute suspension in a progressive flow mode, and for separating the catalyst from cracked products and any uncracked or only partially cracked feed at the end of a predetermined residence time or times, it being preferred that all or at least a substantial portion of the product should be abruptly separated from at least a portion of the catalyst.

For example, the apparatus may include, along its elongated reaction chamber, one or more points for introduction of carbo-metallic feed, one or more points for introduction of catalyst, one or more points for introduction of additional material, one or more points for withdrawl of products and one or more points for withdrawl of catalyst.

This means for introducing feed, catalyst and other material may range from open pipes to sophisticated jets or spray nozzles, it being preferred to use means capable of breaking up the liquid feed into fine droplets. Preferably, the catalyst, liquid water (when used) and fresh feed are brought together in an apparatus similar to that disclosed in U.S. patent application Ser. No. 969,601, now abandoned, of George D. Myers, et al., filed Dec. 14, 1978, the entire disclosure of which is hereby incorporated herein by reference. Accordingly to a particular preferred embodiment based on a suggestion which is understood to have emanated from Mr. Stephen M. Kovach, the liquid water and carbo-metallic oil, prior to their introduction into the riser, are caused to pass through a propeller, apertured disc, or any appropriate high shear agitating means for forming a "homogenized mixture" containing finely divided droplets of oil and/or water with oil and/or water present as a continuous phase.

It is preferred that the reaction chamber, or at least the major portion thereof, be more nearly vertical than horizontal and have a length to diameter ratio of at least about 10, more preferably about 20 or 25 or more. Use of a vertical riser type reactor is preferred. If tubular, the reactor can be of uniform diameter throughout or may be provided with a continuous or step-wise increase in diameter along the reaction path to maintain or vary the velocity along the flow path.

In general, the charging means (for catalyst and feed) and the reactor configuration are such as to provide a relatively high velocity of flow and dilute suspension of catalyst. For example, the vapor or catalyst velocity in the riser will be usually at least about 25 or more typically at least about 35 feet per second. This velocity may range up to about 55 or about 75 feet or about 100 feet per second or higher. The vapor velocity at the top of the reactor may be higher than that at the bottom and may for example be about 80 feet per second at the top and about 40 feet per second at the bottom. The velocity capabilities of the reactor will in general be sufficient to prevent substantial build-up of catalyst bed in the bottom or other portions of the riser, whereby the catalyst loading in the riser can be maintained below about 4 or 5 pounds, as for example about 0.5 pounds, and below about 2 pounds, as for example 0.8 pounds, per cubic foot, respectively, at the upstream (e.g., bottom) and downstream (e.g., top) ends of the riser.

The progressive flow mode involves, for example, flowing of catalyst, feed and products as a stream in a positively controlled and maintained direction established by the elongated nature of the reaction zone. This is not to suggest however that there must be strictly linear flow. As is well known, turbulent flow and "slippage" of catalyst may occur to some extent especially in certain ranges of vapor velocity and some catalyst loadings, although it has been reported advisable to employ sufficiently low catalyst loadings to restrict slippage and back-mixing.

A preferred type of reactor embodies ballistic separation of the catalyst and products; that is, catalyst is projected in a direction established by the riser tube, and is caused to continue its motion in the general direction so established, while the products, having lesser momentum, are caused to make an abrupt change of direction, resulting in an abrupt, substantially instantaneous separation of product from catalyst. In a preferred embodiment referred to as a vented cup riser separator, the riser tube is provided with a substantially unobstructed discharge opening at its downstream end for discharge of suspended catalyst and gasiform material. A gasiform material inlet is provided as an annular inlet about the periphery of the riser outlet. A discharged suspension of the riser outlet is rapidly dissipated in response to a difference in momemtum between solid particle material and the gasiform material. In addition, the solid particles are projected in a flow path promoting separation thereof from discharged gasiform material. The rapid separation and withdrawal recovery of gasiform material into the annular inlet is enhanced by maintaining a reduced pressure in one or more withdrawl conduits communicating with an annular zone or chamber beneath said annular inlet as particularly shown in the figures disclosed below. An exit port near the tube outlet adjacent the downstream end receives the products. The discharge opening communicates with a catalyst flow path which extends to the usual stripper and regenerator, while the exit port communicates with a product flow path which is substantially or entirely separated from the catalyst flow path and leads to separation means for separating the products from the relatively small portion of catalyst, if any, which manages to gain entry to the product exit port. The mode of catalyst/product separation presently deemed best for practicing the present invention is disclosed in FIG. 2, discussed below.

In conventional FCC operations with VGO, the feedstock is customarily preheated, often to temperature significantly higher than are required to make the feed sufficiently fluid for pumping and for introduction into the reactor. For example, preheat temperatures as high as about 371° or 427° C. (700° or 800° F.) have been reported. But in our process as presently practiced it is preferred to restrict preheating of the feed, so that the feed is capable of absorbing a larger amount of heat from the catalyst while the catalyst raises the feed to conversion temperature, at the same time minimizing utilization of external fuels to heat the feedstock. Thus, where the nature of the feedstock permits, it may be fed at ambient temperature. Heavier stocks may be fed at preheat temperatures of up to about 315° C. (600° F.), typically about 93° C. (200° F.) to about 260° C. (500° F.), but higher preheat temperatures are not necessarily excluded.

The catalyst fed to the reactor may vary widely in temperature, for example from about 593° C. (1100° F.) to about 871° C. (1600° F.), more preferably about 649° C. (1200° F.) to about 815° C. (1500° F.) and most preferably about 704° C. (1300° F.) to about 760° C. (1400° F.), with about 718° C. (1325° F.) to about 746° C. (1375° F.) being considered optimum at present.

As indicated previously, the conversion of the carbo-metallic oil to lower molecular weight products may be conducted at a temperature of about 482° C. (900° F.) to about 760° C. (1400° F.), measured at the reaction chamber outlet. The reaction temperature as measured at said outlet is more preferably maintained in the range of about 518° C. (965° F.) to about 704° C. (1300° F.), still more preferably about 524° C. (975° F.) to about 649° C. (1200° F.), and most preferably about 527° C. (980° F.) to about 621° C. (1150° F.). Depending upon the temperature selected and the properties of the feed, all of the feed may or may not vaporize in the riser.

Although the pressure in the reactor may, as indicated above, range from about 10 to about 50 psia, preferred and more preferred pressure ranges are about 15 to about 35 and about 20 to about 35. In general, the partial (or total) pressure of the feed may be in the range of about 3 to about 30, more preferably about 7 to about 25 and most preferably about 10 to about 17 psia. The feed partial pressure may be controlled or suppressed by the introduction of gaseous (including vaporous) materials into the reactor, such as for instance the steam, and water and other additional materials described above. The process has for example been operated with the ratio of feed partial pressure relative to total pressure in the riser in the range of about 0.2 to about 0.8, more typically about 0.3 to about 0.7 and still more typically about 0.4 to about 0.6, with the ratio of added gaseous material (which may include recycled gases and/or steam resulting from introduction of $H_2O$ to the riser in the form of steam and/or liquid water) relative to total pressure in the riser correspondingly ranging from about 0.8 to about 0.2, more typically about 0.7 to about 0.3 and still more typically about 0.6 to about 0.4. In the illustrative operations just described, the ratio of the partial pressure of the added gaseous material relative to the partial pressure of the feed has been in the range of about 0.25 to about 4.0, more typically about 0.4 to about 2.3 and still more typically about 0.7 to about 1.7.

Although the residence time of feed and product vapors in the riser may be in the range of about 0.5 to about 10 seconds, as described above, preferred and more preferred values are about 0.5 to about 6 and about 1 to about 4 seconds, with about 1.5 to about 3.0 seconds currently being considered about optimum. For example, the process has been operated with a riser vapor residence time of about 2.5 seconds or less by introduction of copious amounts of gaseous materials into the riser, such amounts being sufficient to provide for example a partial pressure ratio of added gaseous materials relative to hydrocarbon feed of about 0.8 or more. By way of further illustration, the process has been operated with said residence time being about 2 seconds or less, with the aforesaid ratio being in the range of about 1 to about 2. The combination of low feed partial pressure, very low residence time and ballistic separation of products from catalyst are considered especially beneficial for the conversion of carbo-metallic oils. Additional benefits may be obtained in the foregoing combination where there is a substantial partial pressure of added gaseous material, especially $H_2O$ as described above.

Depending upon whether there is slippage between the catalyst and hydrocarbon vapors in the riser, the catalyst riser residence time may or may not be the same as that of the vapors. Thus, the ratio of average catalyst reactor residence time versus vapor reactor residence time, i.e., slippage, or may be in the range of about 1 to about 5, more preferably about 1 to about 4 and most preferably about 1 to about 3, with about 1 to about 2 currently being considered optimum.

In practice, there will usually be a small amount of slippage, e.g., at least about 1.05 or 1.2. In a operating unit there may for example be a slippage of about 1.1 at the bottom of the riser and about 1.05 at the top.

In certain types of known FCC units, there is a riser which discharges catalyst and product vapors together into an enlarged chamber, usually considered to be part of the reactor, in which the catalyst is disengaged from product and collected. Continued contact of catalyst, uncracked feed (if any) and cracked products in such enlarged chamber results in an overall catalyst feed contact time appreciably exceeding the riser tube residence times of the vapors and catalyst. When practicing the process of the present invention with ballistic separation of catalyst and vapors at the downstream (e.g., upper) extremity of the riser, such as is taught in the above mentioned Myers, et al, patents, the riser residence time and the catalyst contact time are substantially the same for a major portion of the feed and product vapors. It is considered advantageous if the vapor riser residence time and vapor catalyst contact time are substantially the same for at least about 80%, more preferably at least about 90% and more preferably at least about 95% by volume of the total feed and product vapors passing through the riser. That is, the ballistic separation at the top end of the riser separates at least about 80%, more preferably 90%, and most preferably 95% of the vapors from continued contact with the catalyst. By denying such vapors continued contact with catalyst in a catalyst disengagement and collection chamber one may avoid a tendency toward re-cracking and diminished selectivity.

In general, the combination of catalyst to oil ratio, temperatures, pressures and residence times should be such as to effect a substantial conversion of the carbo-metallic oil feedstock. It is an advantage of the process that very high levels of conversion can be attained in a single pass; for example the conversion may be in excess of 50% and may range to about 90% or higher. Preferably, the aforementioned conditions are maintained at levels sufficient to maintain conversion levels in the range of about 60 to about 90% and more preferably about 70 to about 85%. The foregoing conversion levels are calculated by subtracting from 100% the percentage obtained by dividing the liquid volume of fresh feed into 100 times the volume of liquid product boiling at and above 221° C. (430° F.) (tbp, standard atmospheric pressure).

These substantial levels of conversion may and usually do result in relatively large yields of coke, such as for example about 4 to about 14% by weight based on fresh feed, more commonly about 6 to about 13% and most frequently about 10 to about 13%. The coke yield can more or less quantitatively deposit upon the catalyst. At contemplated catalyst to oil ratios, the resultant coke laydown may be in excess of about 0.3, more commonly in excess of about 0.5 and very frequently in excess of about 1% of coke by weight, based on the weight of moisture free regenerated catalyst. Such coke laydown may range as high as about 2%, or about 3% or even higher.

In common with conventional FCC operations on VGO, the present process includes stripping of spent catalyst after disengagement of the catalyst from product vapors. Persons skilled in the art are acquainted with appropriate stripping agents and conditions for stripping spent catalyst, but in some cases the present process may require somewhat more severe conditions than are commonly employed. This may result, for example, from the use of carbo-metallic oil having constituents which do not volatilize under the conditions prevailing in the reactor, which constituents deposit themselves at least in part on the catalyst. Such absorbed, unvaporised material can be troublesome from at least two standpoints. First, if the gases (including vapors) used to strip the catalyst can gain admission to a catalyst disengagement or collection chamber connected to the downstream end of the riser, and if there is an accumulation of catalyst in such chamber, vaporization of these unvaporized hydrocarbons in the stripper can be followed by adsorption on the bed of catalyst in the chamber. More particularly, as the catalyst in the stripper is stripped of adsorbed feed material, the resultant feed material vapors pass through the bed of catalyst accumulated in the catalyst collection and/or disengagement chamber and may deposit coke and/or condensed material on the catalyst in said bed. As the catalyst bearing such deposits moves from the bed and into the stripper and from thence to the regenerator, the condensed products can create a demand for more stripping capacity, while the coke can tend to increase regeneration temperatures and/or demand greater regeneration capacity. For the foregoing reasons, it is preferred to prevent or restrict contact between stripping vapors and catalyst accumulations in the catalyst disengagement or collection chamber. This may be done for example by preventing such accumulations from forming, e.g., with the exception of a quantity of catalyst which essentially drops out of circulation and may remain at the bottom of disengagement and/or collection chamber, the catalyst that is in circulation may be removed from said chamber promptly upon settling to the bottom of the chamber. Also, the minimize regeneration temperatures and demand for regeneration capacity, it may be desirable to employ conditions of time, temperature and atmosphere in the stripper which are sufficient to reduce potentially volatile hydrocarbon material borne by the stripped catalyst to about 10% or less by weight of the total carbon loading on the catalyst. Such stripping may for example include reheating of the catalyst, extensive stripping with steam, the use of gases having a temperature considered higher than normal for FCC/VGO operations, such as for instance flue gas from the regenerator, as well as other refinery stream gases such as hydrotreater off-gas ($H_2S$ containing), hydrogen and others. For example, the stripper may be operated at a temperature of about 177° C. (350° F.) using steam at a pressure of about 150 psig and a weight ratio of steam to catalyst of about 0.002 to about 0.003. On the other hand, the stripper may be operated at a temperature of about 552° C. (1025° F.) or higher.

Substantial conversion of carbo-metallic oils to lighter products in accordance with the invention tends to produce sufficiently large coke yields and coke laydown on catalyst to require some care in catalyst regeneration. In order to maintain adequate activity in zeolite and non-zeolite catalysts, it is desirable to regenerate the catalyst under conditions of time, temperature and atmosphere sufficient to reduce the percent by weight of carbon remaining on the catalyst to about 0.25% or less, whether the catalyst bears a large heavy metals accumulation or not. Preferably this weight percentage is about 0.1% or less and more preferably about 0.05% or less, especially with zeolite catalyst. The amounts of coke which must therefore be burned off of the catalyst when processing carbo-metallic oils are usually substantially greater than would be the case when cracking VGO. The term coke when used to describe the present invention, should be understood to include any residual unvaporized feed or cracking product, if any such material is present on the catalyst after stripping.

Regeneration of catalyst, burning away of coke deposited on the catalyst during the conversion of the feed, may be performed at any suitable temperature in the range of about 593° C. (1100° F.) to about 871° C. (1600° F.), measured at the regenerator catalyst outlet. This temperature is preferably in the range of about 649° C. (1200° F.) to about 815° C. (1500° F.), more preferably about 691° C. (1275° F.) to about 774° C. (1425° F.) and optimally about 718° C. (1325° F.) to about 746° C. (1375° F.). The process has been operated, for example, with a fluidized regenerator with the temperature of the catalyst dense phase in the range of about 704° C. (1300° F.) to about 760° C. (1400° F.).

Regeneration is preferably conducted while maintaining the catalyst in one or more fluidized beds in one or more fluidization chambers. Such fluidized bed operations are characterized, for instance, by one or more fluidized dense beds of ebulliating particles having a bed density of, for example, about 25 to about 50 pounds per cubic foot. Fluidization is maintained by passing gases, including combustion supporting gases, through the bed at a sufficient velocity to maintain the particles in a fluidized state but at a velocity which is sufficiently small to prevent substantial entrainment of particles in the gases. For example, the lineal velocity of the fluidizing gases may be in the range of about 0.2 to about 4 feet per second and preferably about 0.2 to about 3 feet per second. The average total residence time of the particles in the one or more beds in substantial, ranging for example from about 5 to about 30, more preferably about 5 to about 20 and still more preferably about 5 to about 10 minutes From the foregoing, it may be readily seen that the fluidized bed regeneration of the present invention is readily distinguishable from the short-contact, low-density entrainment type regeneration which has been practiced in some FCC operations.

When regenerating catalyst to very low levels of carbon on regenerated catalyst, e.g., about 0.1% or less or about 0.05% or less, based on the weight of regenerated catalyst, it is acceptable to burn off at least about the last 10% or at least about the last 5% by weight of coke (based on the total weight of coke on the catalyst immediately prior to regeneration) in contact with combustion producing gases containing excess oxygen. In this connection it is contemplated that some selected portion of the coke, ranging from all of the coke down to about the last 5 or 10% by weight, can be burned with excess oxygen. By excess oxygen is meant an amount in excess of the stoichiometric requirement for burning all of the hydrogen to water, all of the carbon to carbon dioxide and all of the other combustible components, if any, which are present in the above-mentioned selected portion of the coke immediately prior to regeneration, to their highest stable state of oxidation under the regenerator conditions. The gaseous products of combustion obtained in the presence of excess oxygen will normally include an appreciable amount of free oxygen. Such free oxygen, unless removed from the by-product gases or converted to some other form by a means or process other than regeneration, will normally manifest itself as free oxygen in the flue gas from the regenerator unit. In order to provide sufficient driving force to complete the combustion of the coke with excess oxygen, the amount of free oxygen will normally be not merely appreciable but substantial, i.e., there will be a concentration of at least about 2 mole percent of free oxygen in the total regeneration flue gas recovered from the entire, completed regeneration operation. While such technique is effective in attaining the desired low levels of carbon on regenerated catalyst, it has its limitations and difficulties as will become apparent from the discussion below.

Heat released by combustion of coke in the regenerator is absorbed by the catalyst and can be readily retained thereby until the regenerated catalyst is brought into contact with fresh feed. When processing carbo-metallic oils to the relatively high levels of conversion involved in the present invention, the amount of regenerator heat which is transmitted to fresh feed by way of recycling regenerated catalyst can substantially exceed the level of heat input which is appropriate in the riser for heating and vaporizing the feed and other materials, for supplying the endothermic heat of reaction for cracking, for making up the heat losses of the unit and so forth. Thus, in accordance with the invention, the amount of regenerator heat transmitted to fresh feed may be controlled, or restricted where necessary, within certain approximate ranges. The amount of heat so transmitted may for example be in the range of about 500 to about 1200, more particularly about 600 to about 900, and more particularly about 650 to about 850 BTUs per pound of fresh feed. The aforesaid ranges refer to the combined heat, in BTUs per pound of fresh feed, which is transmitted by the catalyst to the feed and reaction products (between the contacting of feed with the catalyst and the separation of product from catalyst) for supplying the heat of reaction (e.g., for cracking) and the difference in enthalpy between the products and the fresh feed. Not included in the foregoing are the heat made available in the reactor by the adsorption of coke on the catalyst, nor the heat consumed by heating, vaporizing or reacting recycle streams and such added materials as water, steam naphtha and other hydrogen donors, flue gases and inert gases, or by radiation and other losses.

One or a combination of techniques may be utilized in this invention for controlling or restricting the amount of regeneration heat transmitted via catalyst to fresh feed.

For example, one may add a combustion modifier to the cracking catalyst in order to reduce the temperature of combustion of coke to carbon dioxide and/or carbon monoxide in the regenerator. Moreover, one may remove heat from the catalyst through heat exchange means, including, for example, heat exchangers (e.g., steam coils) built into the regenerator itself, whereby one may extract heat from the catalyst during regeneration. Heat exchangers can be built into catalyst transfer lines, such as for instance the catalyst return line from the regenerator to the reactor, whereby heat may be removed from the catalyst after it is regenerated. The amount of heat imparted to the catalyst in the regenerator may be restricted by reducing the amount of insulation on the regenerator to permit some heat loss to the surrounding atmosphere, especially if feeds of exceedingly high coking potential are planned for processing; in general, such loss of heat to the atmosphere is considered economically less desirable than certain of the other alternatives set forth herein. One may also inject cooling fluids into portions of the regenerator other than those occupied by the dense bed, for example water and/or steam, whereby the amount of inert gas available in the regenerator for heat absorption and removal is increased.

Another suitable and preferred technique for controlling or restricting the heat transmitted to fresh feed via recycled regenerated catalyst involves maintaining a specified ratio between the carbon dioxide and carbon monoxide formed in the regenerator while such gases are in heat exchange contact or relationship with catalyst undergoing regeneration. In general, all or a major portion by weight of the coke present of the catalyst immediately prior to regeneration is removed in at least one combustion zone in which the aforesaid ratio is controlled as described below. More particularly, at least the major portion more preferably at least about 65% and more preferably at least about 80% by weight of the coke on the catalyst is removed in a combustion zone in which the molar ratio of $CO_2$ to $CO$ is maintained at a level substantially below 5, e.g., about 4 or less. Looking at the $CO_2/CO$ relationship from the inverse standpoint, it is preferred that the $CO/CO_2$ molar ratio should be at least about 0.25 and preferably at least about 0.3 and still more preferably about 1 or more or even 1.5 or more.

While persons skilled in the art are aware of techniques for inhibiting the burning of $CO$ to $CO_2$, it has been suggested that the mole ratio of $CO:CO_2$ should be kept less than 0.2 when regenerating catalyst with large heavy metals accumulations resulting from the processing of carbo-metallic oils, in this connection see for example U.S. Pat. No. 4,162,213 to Zrinscak, Sr., et al. In this invention, however, CO production is increased while catalyst is regenerated to about 0.1% carbon or less, and preferably to about 0.05% carbon or less. Moreover, according to a preferred method of carrying out the invention the sub-process of regeneration, as a whole, may be carried out to the above-mentioned low levels of carbon on regenerated catalyst with a deficiency of oxygen; more specifically, the total oxygen supplied to the one or more stages of regeneration can be and preferably is less than the stoichiometric amount which would be required to burn all hydrogen in the coke to $H_2O$ and to burn all carbon in the coke to $CO_2$. If the coke includes other combustibles, the aforementioned stoichiometric amount can be adjusted to include the amount of oxygen required to burn them.

Still another particularly preferred technique for controlling or restricting the regeneration heat imparted to fresh feed via recycled catalyst involves the diversion of a portion of the heat borne by recycled catalyst to added materials introduced in to the reactor, such as the water, steam, naphtha, other hydrogen donors, flue gases, inert gases, and other gaseous or vaporizable materials which may be introduced into the reactor.

The larger the amount of coke which must be burned from a given weight of catalyst, the greater the potential for exposing the catalyst to excessive temperatures. Many otherwise desirable and useful cracking catalysts are particularly susceptible to deactivation at high temperatures, and among these are quite a few of the costly molecular sieve or zeolite types of catalyst. The crystal structures of zeolites and the pore structures of the catalyst carriers generally are somewhat susceptible to thermal and/or hydrothermal degradation. The use of such catalysts in catalytic conversion processes for carbo-metallic feeds creates a need for regeneration techniques which will not destroy the catalyst by exposure to highly severe temperatures and steaming. Such need can be met by a multi-stage regeneration process which includes conveying spent catalyst into a first regeneration zone and introducing oxidizing gas thereto. The amount of oxidizing gas that enters said first zone and the concentration of oxygen or oxygen bearing gas therein are sufficient for only partially effecting the desired conversion of coke on the catalyst to carbon oxide gases. The partially regenerated catalyst is then removed from the first regeneration zone and is conveyed to a second regeneration zone. Oxidizing gas is introduced into the second regeneration zone to provide a higher concentration of oxygen or oxygen-containing gas than in the first zone, to complete the removal of carbon to the desired level. The regenerated catalyst may then be removed from the second zone and recycled to the reactor for contact with fresh feed. An example of such multi-stage regeneration process is described in U.S. patent application Ser. No. 969,602 of George D. Myers, et al, filed Dec. 14, 1978, now abandoned, the entire disclosure of which is hereby incorporated herein by reference.

Multi-stage regeneration offers the possibility of combining oxygen deficient regeneration with the control of the $CO:CO_2$ molar ratio. Thus, about 50% or more, more preferably about 65% to about 95%, and more preferably about 80% to about 95% by weight of the coke on the catalyst immediately prior to regeneration may be removed in one or more stages of regeneration in which the molar ratio of $CO:CO_2$ is controlled in the manner described above. In combination with the foregoing, the last 5% or more, or 10% or more by weight of the coke originally present, up to the entire amount of coke remaining after the preceding stage or stages, can be removed in a subsequent stage of regeneration in which more oxygen is present. Such process is susceptible of operation in such a manner that the total flue gas recovered from the entire, completed regeneration operation contains little or no excess oxygen, i.e., on the order of about 0.2 mole percent or less, or as low as about 0.2 mole percent or less, which is substantially less than the 2 mole percent which has been suggested elsewhere. Thus, multi-stage regeneration is particularly beneficial in that it provides another convenient technique for restricting regeneration heat transmitted to fresh feed via regenerated catalyst and/or reducing the potential for thermal deactivation, while simultaneously affording an opportunity to reduce the carbon level on regenerated catalyst to those very low percentages (e.g., about 0.1% or less) which particularly enhance catalyst activity. For example, a two-stage regeneration process may be carried out with the first stage burning about 80% of the coke at a bed temperature of about 704° C. (1300° F.) to produce CO and $CO_2$ in a molar ratio of $CO/CO_2$ of about 1 and the second stage burning about 20% of the coke at a bed temperature of about 732° C. (1350° F.) to produce substantially all $CO_2$ mixed with free oxygen. Use of the gases from the second stage, as combustion supporting gases for the first stage, along with additional air introduced into the first stage bed, results in an overall CO to $CO_2$ ratio of about 0.6, with a catalyst residence time of about 5 to 15 minutes total in the two zones. Moreover, where the regeneration conditions, e.g., temperature or atmosphere, are substantially less severe in the second zone than in the first zone (e.g. by at least about 10 and preferably at least about −7° C. [20° F.]), that part of the regeneration sequence which involves the most severe conditions is performed while there is still an appreciable amount of coke on the catalyst. Such operation may provide some protection of the catalyst from the more severe conditions. A particularly preferred emmbodiment of the invention is two-stage fluidized regeneration at a maximum temperature of about 815° C. (1500° F.) with a reduced temperature of at least about −12° C. or −7° C. (10° F. or 20° F.) in the dense phase of the second stage as compared to the dense phase of the first stage, and with reduction or carbon on catalyst to about 0.05% or less or even about 0.025% or less by weight in the second zone. In fact, catalyst can readily be regenerated to carbon levels as low as 0.01% by this technique, even though the carbon on catalyst prior to regeneration is as much as about 1%.

In most circumstances, it will be important to insure that no adsorbed oxygen containing gases are carried into the riser by recycled catalyst. Thus, whenever such action is considered necessary, the catalyst discharged from the regenerator may be stripped with appropriate stripping gases to remove oxygen containing gases. Such stripping may for instance be conducted at relatively high temperatures, for example about 732° C. (1350° F.) to about 743° C. (1370° F.), using steam, nitrogen or other inert gas as the stripping gas(es). The use of nitrogen and other inert gases is beneficial from the standpoint of avoiding a tendency toward hydrothermal catalyst deactivation which may result from the use of steam.

The following comments and discussion relating to metals management, carbon management and heat management may be of assistance in obtaining best results when operating the invention. Since these remarks are for the most part directed to what is considered the best mode of operation, it should be apparent that the invention is not limited to the particular modes of operation discussed below. Moreover, since certain of these comments are necessarily based on theoretical considerations, there is no intention to be bound by any such theory, whether expressed herein or implicit in the operating suggestions set forth hereinafter.

Although discussed separtely below, it is readily apparent that metals management, carbon management and heat management are interrelated and interdependent subjects both in theory and practice. While coke yield and coke laydown on catalyst are primarily the result of the relatively large quantities of coke precursors found in carbo-metallic oils, the production of coke is exacerbated by high metals accumulations, which can also significantly affect catalyst performance. Moreover, the degree of success experienced in metal management and carbon management will have a direct influence on the extent to which heat management is necessary. Moreover, some of the steps taken in support of metals management have proved very helpful in respect to carbon and heat management.

As noted previously the presence of a large heavy metals accumulation on the catalyst tends to aggravate the problem of dehydrogenation and aromatic condensation, resulting in increased production of gases and coke for a feedstock of a given Ramsbottom carbon value. The introduction of substantial quantities of $H_2O$ into the reactor, either in the form of steam or liquid water, appears highly beneficial from the standpoint of keeping the heavy metals in a less harmful form, i.e., the oxide rather than metallic form. This is of assistance in maintaining the desired selectivity.

Also, a unit design in which system components and residence times are selected to reduce the ratio of catalyst reactor residence time relative to catalyst regenerator residence time will tend to reduce the ratio of the time during which the catalyst is respectively under reduction conditions and oxidation conditions. This too can assist in maintaining desired levels of selectivity.

Whether the metals content of the catalyst is being managed successfully may be observed by monitoring the total hydrogen plus methane produced in the reactor and/or the ratio of hydrogen to methane thus produced. In general, it is considered that the hydrogen to methane mole ratio should be less than about 1 and preferably about 0.6 or less, with about 0.4 or less being considered about optimum. In actual practice the hydrogen to methane ratio may range from about 0.5 to about 1.5 and average about 0.8 to about 1.

Careful carbon management can improve both selectivity (the ability to maximize production of valuable products), and heat productivity. In general, the techniques of metals control described above are also of assistance in carbon management. The usefulness of water addition in respect to carbon management has already been spelled out in considerable detail in that part of the specification which relates to added materials for introduction into the reaction zone. In general, those techniques which improve dispersion of the feed in the reaction zone should also prove helpful, these include for instance the use of fogging or misting devices to assist in dispersing the feed.

Catalyst to oil ratio is also a factor in heat management. In common with prior FCC practice on VGO, the reactor temperature may be controlled in the practice of the present invention by respectively increasing or decreasing the flow of hot regenerated catalyst to the reactor in response to decreases and increases in reactor temperature, typically the outlet temperature in the case of a riser type reactor. Where the automatic controller for catalyst introduction is set to maintain an excessive catalyst to oil ratio, one can expect unnecessarily large rates of carbon production and heat release, relative to the weight of fresh feed charged to the reaction zone.

Relatively high reactor temperatures are also beneficial from the standpoint of carbon management. Such higher temperatures foster more complete vaporization of feed and disengagement of product from catalyst.

Carbon management can also be facilitated by suitable restriction of the total pressure in the reactor and the partial pressure of the feed. In general, at a given level of conversion, relatively small decreases in the aforementioned pressures can substantially reduce coke production. This may be due to the fact that restricting total pressure tends to enhance vaporization of high boiling components of the feed, encourage cracking and facilitate disengagement of both unconverted feed and higher boiling cracked products from the catalyst. It may be of assistance in this regard to restrict the pressure drop of equipment downstream of and in communication with the reactor. But if it is desired or necessary to operate the system at higher total pressure, such as for instance because of operating limitations (e.g., pressure drop in downstream equipment) the above described benefits may be obtained by restricting the feed partial pressure. Suitable ranges for total reactor pressure and feed partial pressure have been set forth above, and in general it is desirable to attempt to minimize the pressure within these ranges.

The abrupt separation of catalyst from product vapors and unconverted feed (if any) is also of great assistance. For this reason ballistic separation equipment is the preferred type of apparatus for conducting this process. For similar reasons, it is beneficial to reduce insofar as possible the elapsed time between separation of catalyst from product vapors and the commencement of stripping. The cup-type vented riser and prompt stripping tend to reduce the opportunity for coking of unconverted feed and higher boiling cracked products adsorbed on the catalyst.

A particularly desirable mode of operation from the standpoint of carbon management is to operate the process in the vented riser using a hydrogen donor if necessary, while maintaining the feed partial pressure and total reactor pressure as low as possible, and incorporating relatively large amounts of water, steam and if desired, other diluents, which provide the numerous benefits discussed in greater detail above. Moreover, when liquid water, steam, hydrogen donors, hydrogen and other gaseous or vaporizable materials are fed to the reaction zone, the feeding of these materials provides an opportunity for exercising additional control over catalyst to oil ratio. Thus, for example, the practice of increasing or decreasing the catalyst to oil ratio for a given amount of decrease or increase in reactor temperature may be reduced or eliminated by substituting either appropriate reduction or increase in the charging ratios of the water, steam and other gaseous or vaporizable material, or an appropriate reduction or increase in the ratio of water to steam and/or other gaseous materials introduced into the reaction zone.

Heat management includes measures taken to control the amount of heat released in various parts of the process and for dealing successfully with such heat as may be released. Unlike conventional FCC practice using VGO, wherein it is usually a problem to generate sufficient heat during regeneration to heat balance the reactor, the processing of carbo-metallic oils generally produces so much heat as to require careful management thereof.

Heat managment can be facilitated by various techniques associated with the materials introduced into the reactor. Thus, heat absorption by feed can be maximized by minimum preheating of feed, it being necessary only that the feed temperature be high enough so that it is sufficiently fluid for successful pumping and dispersion in the reactor. When the catalyst is maintained in a highly active state with the suppression of coking (metals control), so as to achieve higher conversion, the resultant higher conversion and greater selectivity can increase the heat absorption of the reaction. In general, higher reactor temperatures promote catalyst conversion activity in the face of more refractory and higher boiling constituents with high coking potentials. While the rate of catalyst deactivation may thus be increased, the higher temperature of operation tends to offset this loss in activity. Higher temperatures in the reactor also contribute to enhancement of octane number, thus offsetting the octane depressant effect of high carbon laydown. Other techniques for absorbing heat have also been discussed above in connection with the introduction of water, steam, and other gaseous or vaporizable materials into the reactor.

The invention may also be applied to the RCC conversion of crude oils and crude oil fractions as disclosed in U.S. Pat. No. 4,384,948, filed May 13, 1981, of Dwight F. Barger, entitled "Single Unit RCC", the entire contents of which are hereby incorporated herein by reference.

As noted above, the invention can be practiced in the above-described modes and in many others. An illustrative, non-limiting preferred example is described by the accompanying schematic diagram of FIG. I and by the description of this figure which follows.

Referring in detail to FIG. 1 343° C.+(650° F.+) carbo-metallic oil passes along a feed conduit 82 to a junction with a water line 84 having control valve 83. Through suitable metering and control means (not shown) liquid water and the 343° C.+(650° F.+) carbo-metallic oil may be supplied in predetermined proportions to pump 79. The latter discharged a mixture of water and converter feed through control valve 80, feed preheater heat exchanger 81 and a continuation of feed conduit 82 into a riser type reactor 91.

In the operation of riser type reactor 91, catalyst is delivered to the reactor through catalyst standpipe 86, the flow of catalyst being regulated by a control valve 87 and suitable automatic control equipment (not shown) with which persons skilled in the art of designing and operating riser type cracking units are familiar.

After cracking of the feed in riser 91 and separation of the products from catalyst in disengagement vessel 92, the catalyst departs disengagement vessel 92 through stripper 94. Spent catalyst passes from stripper 94 to regenerator 101 via spent catalyst transfer pipe 97 having a slide valve 98 for controlling flow.

Regenerator 101 is divided into upper chamber 102 and lower chamber 103 by a divider panel 104 intermediate the upper and lower ends of the regenerator vessel. The spent catalyst from transfer pipe 97 enters upper chamber 102 in which the catalyst is partially regenerated. A funnel-like collector 106 having a bias-cut upper edge receives partially regenerated catalyst from the upper surface of the dense phase of catalyst in upper chamber 102 and delivers it, via drop leg 107 having an outlet 110, beneath the upper surface of the dense phase of catalyst in lower chamber 103. Instead of internal catalyst drop leg 107, one may use an external drop leg, not shown in the drawing. Valve means in such external drop leg can control the residence time and flow rate in and between the upper and lower chambers. Make up catalyst and/or catalyst or regenerator additives may be added to the upper chamber 102 and/or the lower chamber 103 through addition lines (not shown).

Air is supplied to the regenerator through an air supply pipe 113. A portion of the air travels through a branch supply pipe 114 to bayonet 115 which extends upwardly into the interior of plenum 111 along its central axis. Catalyst in chamber 103 has access to the space within plenum 111 between its walls and bayonet 115. A smaller bayonet (not shown) in the aforementioned space fluffs the catalyst and urges it upwardly toward a horizontally arranged ring distributor (not shown) adjacent the open top of plenum 111 where it opens into chamber 103. The remainder of the air passing through air supply pipe 113 may be heated in air heater 117 (at least during start-up with VGO) and is then introduced into inlet 118 of the ring distributor, which may be provided with holes, nozzles or other apertures which produce an upward flow of gas to fluidize the partially regenerated catalyst in chamber 103.

The air in chamber 103 completes the regeneration of the partially regenerated catalyst received via drop leg 107. The amount of air supplied is sufficient so that the resultant combustion gases are still able to support combustion upon reaching the top of chamber 103 and entering chamber 102. Drop leg 107 extends through an elarged aperture in panel 104, to which is secured a gas distributor 120 which is concentric with and surrounds a drop leg. Combustion supporting gases from chamber 103, which have been partially depleted, are introduced via gas distributor 120 into upper regenerator chamber 102 where they contact incoming coked catalyst from coked catalyst transfer pipe 97. Apertured probes 121 in gas distributor 120 assist in achieving a uniform distribution of the partially depleted combustion supporting gas into upper chamber 102. Supplemental air or cooling fluids may be introduced into upper chamber 102 through a supply pipe 122, which may also discharge through gas distributor 120.

Fully regenerated catalyst with less than about 0.25% carbon, preferably less than about 0.1% and more preferably less than about 0.05%, is discharged from lower regenerator chamber 103 through regenerated catalyst stripper 128, whose outlet feeds into catalyst standpipe 86. Thus, regenerated catalyst is returned to riser 91 for contact with additional fresh feed.

The division of the regenerator into upper and lower regeneration chambers 102 and 103 not only smooths out variations in catalyst regenerator residence time but is also uniquely of assistance in restricting the quantity of regeneration heat which is imparted to the fresh feed while yielding a regenerated catalyst with low levels of coke for return to the riser.

Because of the arrangement of the regenerator, coked catalyst from transfer line 97, with a relatively high loading of carbon, contacts in chamber 102 combustion supporting gases which have already been at least partially depleted of oxygen by the burning of carbon from partially regenerated catalyst in lower chamber 102. Because of this, it is possible to control both the combustion of carbon and the quantity of carbon dioxide produced in upper regeneration chamber 102. Although regenerating gas introduced through air supply pipe 113 and branch conduit 114 may contain relatively large quantities of oxygen, the partially regenerated catalyst which is contacted in lower chamber 103 has already had a major portion of its carbon removed. the high oxygen concentration and temperature in chamber 103 combine to rapidly remove the remaining carbon in the catalyst, thereby achieving a clean, regenerated catalyst with a minimum of heat release. Thus, here again, the combustion temperature and the ratio of $CO_2$ to CO in the lower chamber are readily controlled. The regeneration off gases are discharged from upper chamber 102 via gas pipe 123, regulator valve 124, catalyst fines trap 125 and outlet 126.

The vapor products from disengagement vessel 92 may be processed in any convenient manner such as by discharge through vapor line 131 to fractionator 132. Fractionator 132 includes a bottoms outlet 133, side outlet 134, flush oil stripper 135, and stripper bottom line 136 connected to pump 137 for discharging flush oil. Overhead product from stripper 135 returns to fractionator 132 via line 138.

The main overhead discharge line 139 of the fractionator is connected to an overhead receiver 142 having a bottoms line 143 feeding into pump 144 for discharging gasoline product. A portion of this product may be returned to the fractionator via recirculation line 145, the flow being controlled by valve 146. The receiver 142 also includes a water receiver 147 and a water discharge line 148. The gas outlet 150 of the overhead receiver discharges a stream which is mainly below $C_5$, but containing some $C_5$, $C_6$ and $C_7$ material. If desired, the $C_5$ and above material in the gas stream may be separated by compression, cooling and fractionation, and recycled to receiver 142.

The oxidizing gas, such as air, introduced into regeneration zone 103 through line 114 may be mixed with a cooling spray of water from a conduit 109. The mixture of oxidizing gas and atomized water flows through bayonet 115 and thus into the lower bed of catalyst particles.

The apertures in distributor 120 are large enough so that the upwardly flowing gas readily passes therethrough into zone 102. However, the perforations are sized so that the pressure difference between the upper and lower zones prevents catalyst particles from passing downwardly through the distributor. The bayonet 115 and distributor are similarly sized. Gases exiting the regenerator comprise combustion products, nitrogen, stream formed by combustion reactions and/or from vaporizing water added to the regenerator, and oxides of sulfur and other trace elements. These gases are separated from suspended catalyst particles by a cyclone separator (not shown) and then pass out of the regenerator through discharge conduit 123.

Figure 2:
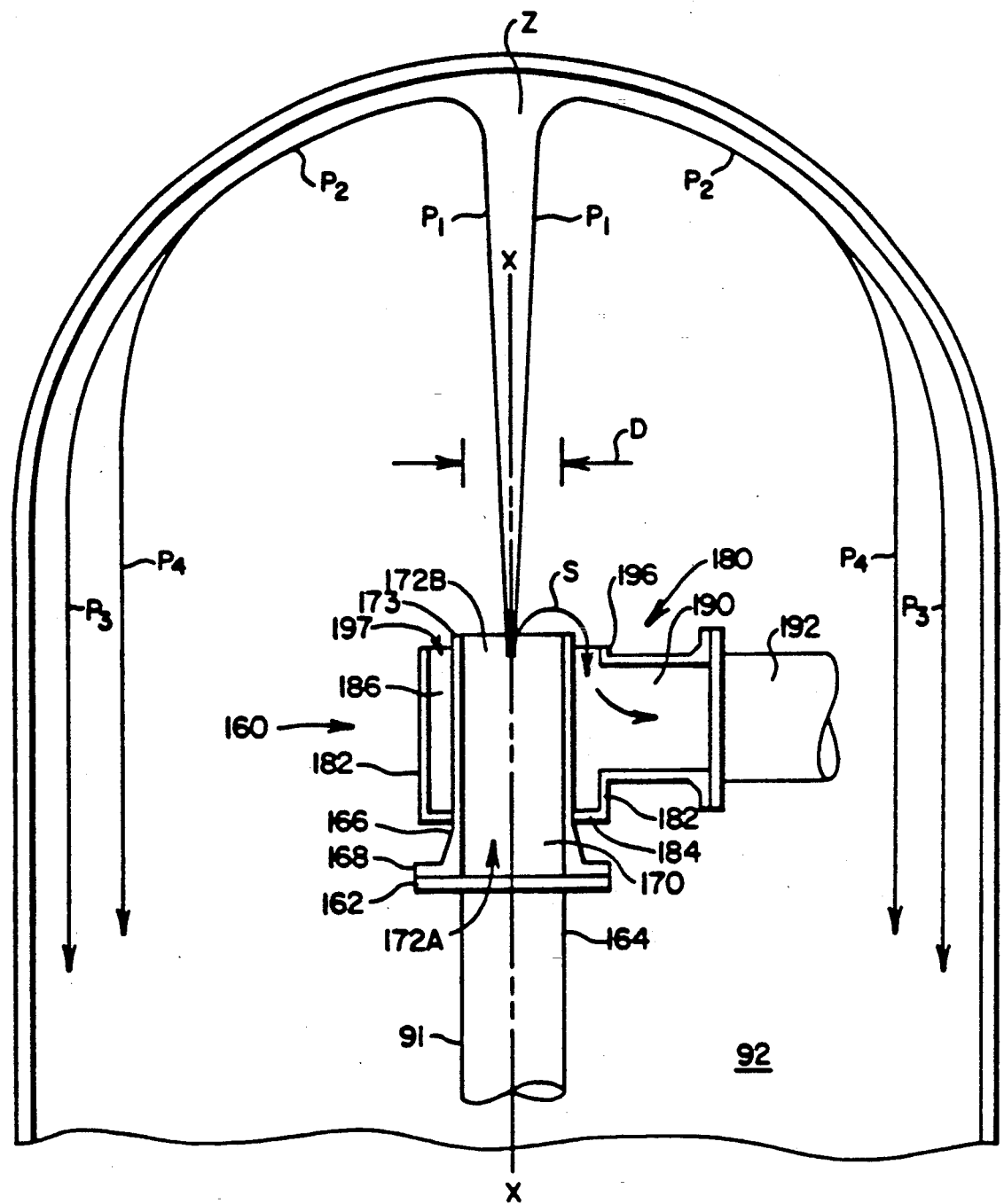
FIG. 2 is a diagrammatic sketch of the upper discharge end of a riser contact zone provided with an annular chamber about the upper periphery of the riser and provided with conduit means for removing gasiform material from said annular chamber to another desired zone. The upper discharge end of the riser is housed within a larger diameter dome shaped vessel.

While this invention may be used with single stage regenerators, or with multiple stage regenerators which have basically concurrent instead of countercurrent flow between combustion gases and catalysts, it is especially useful in regenerators of the type shown in FIG. 2, which has countercurrent flow and is well-suited for producing combustion product gases having a low ratio of $CO_2$ to CO, which helps lower regeneration temperatures in the presence of high carbon levels.

Since zeolite in the catalyst may be damaged by excessive temperatures and/or excessive residence times at such temperatures, it is preferable to use a regenerator having two or more stages or zones. Division of the regenerator into upper and lower regeneration chambers as shown in FIG. II is of unique assistance in controlling regeneration so that low levels of coke on regenerated catalyst can be attained without subjecting the catalyst to excessive temperature.

FIG. 2 shows in enlarged vertical cross-section the upper portion of disengagement chamber 92, the upper end 164 of riser 91 within chamber 92, and the details of the gas/solids separation equipment therein. More specifically, a separation apparatus for effecting separation of hydrocarbon conversion products from suspended solid catalyst particles is shown in cross-section and generally indicated by numeral 160.

The separation apparatus includes an outlet section. This may be any hollow member defining a passageway which either constitutes part of the elongated reaction chamber itself and includes its outlet end, or is an extension or branch of the reaction chamber which is in direct communication with the chamber for receiving a stream including catalyst particles suspended in products. In certain instances there will be no discernible line of demarcation between the outlet section and upstream portions of the reaction chamber, i.e. they can both be part of the same length of pipe. In other instances, as disclosed herein, the apparatus 160 includes a hollow outlet section 166 having an end flange 168 compatible in size with and secured, such as by bolting or welding (not shown), to a downstream end flange 162 of upper end 164 of tubular riser 91. Outlet section 166 may instead be an integral extension of tubular riser 91 or may be butt welded to upper end 146 to eliminate flanges 162 and 168.

As shown in the drawing, passageway 170 has a circular cross-section of substantially uniform cross-section throughout substantially its entire length, commencing with an inlet portion 172A and terminating with an outlet portion 172B, having a terminal lip 173. As will be explained hereinafter, the outlet portion 172B and lip 173 may be of the same, larger or smaller cross-sectional area as compared to the inlet portion 172A and/or the riser 91 internal cross-section. Moreover, it is not essential that the passageway 170, lip 173, and inlet and outlet portions 172A and 172B be of circular cross-sections. Other regular and irregular shapes are contemplated and acceptable.

Risers have been successfully used which include one or more bends intermediate their upstream and downstream ends, and the invention is usable with risers of this type. A sharp bend in the riser can substantially decelerate the catalyst particles. Thus, if there is a significant bend a short distance upstream of the outlet section outlet portion 172B, and if the resultant reduction in catalyst velocity severely impairs the separation efficiency of the device, it may be desirable or necessary to increase the radius of the bend and/or move it further upstream relative to the outlet portion 172B. This will permit the catalyst particles to reaccelerate before reaching the outlet portion, assuming the product vapors in the vapor/solids stream continue, for a substantial distance downstream of the bend, to move at a faster velocity than did the catalyst particles upon leaving the bend. In the present embodiment however, the outlet section 166 and its discharge flow passageway 170 have a longitudinal axis X—X which is conincident with the longitudinal axis of the flow passageway which exists throughout the length of straight riser 91, only the upstream end 164 of which is shown in FIG. 2. It is also preferred that inlet portion 172A and outlet portion 172B be in substantial axial alignment with one another to provide a continuous discharge flow passageway for hydrocarbon conversion products and solid catalyst particles flowing from tubular riser 164.

For best results, it is presently recommended that the outlet section 170 be positioned with its axis X—X vertical or near vertical, e.g. if desired the axis may be canted from the vertical by an angle of up to about −1° C. (30° F.), more preferably up to about −7° C. (20° F.), and still more preferably up to about −12° C. (10° F.). The use of larger angles is contemplated, but losses of efficiency are experienced as the above-mentioned angle is increased. However, inverted operation in vertical or near vertical position, i.e. with the outlet portion 172B opening downward, is also contemplated, and may in some instances derive an advantage from the effect of gravity.

Separation apparatus 160 includes an annular chamber 180 open in the upper end thereof is attached externally to the periphery of outlet section 166. Apparatus assembly 180 includes an annular chamber with an outer wall portion 182 extending substantially parallel to the peripheral wall of the outlet section 166. The annular chamber is closed at the bottom with a connecting wall portion 184 extending inwardly from the outer wall portion 182 toward the outer wall of riser outlet section 166. One or more openings in connecting wall portion 184 provide a means of aspirating catalyst particles collected in the bottom of the annular disengagement chamber. Outer wall portion 182 and connecting wall portion 184 define a substantially rectangular cup-shaped shroud in cross-section or annular chamber about the upper end of a riser means and adjacent the discharge end thereof.

At least one gasiform material outlet opening 190 is provided through the wall 182 of the annular chamber. Outlet opening 190 serves to provide a gasiform material passageway between annular passageway 186 and a connecting withdrawal or outlet conduit 192. Outlet conduit 192 may extend from wall 182 to a second stage separation device such as a conventional cyclone assembly (not shown) position either within or outside the larger diameter vessel in which the riser terminates.

As noted in FIG. 2, separation apparatus 160 attached to the downstream end portion of riser 164 are located within a disengagement chamber 92 provided with a dome shaped head portion. The only exit path from disengagement chamber 92 for hydrocarbon conversion products or gasiform material discharged from riser 164 and extension apparatus 166 is through the annular section 186 to the outlet port 190 and into outlet conduit 192.

Only a single outlet port 190 with attached conduit 192 is shown in FIG. 2. It is within the scope of the present invention however to employ a plurality of such outlets radiating outwardly from said annular zone 186.

In another embodiment outlet port or opening 190 may be located above or below the discharge end of cylindrical extension 166 provided with lip 173. In order to locate opening 190 above lip 173, the height or downstream outer wall 182 of the annular chamber if extended an appropriate distance downstream of lip 173. Depending on the diameter of tubular riser 164 and larger diameter disengagement chamber 94, a number of separate outlet ports 190 may be circumferentially spaced from one another about outer wall portion 182, with each outlet port having its own outlet conduit 192. More than one outlet port 190 may lead to a single outlet conduit comprising a common flow manifold or the like.

Adherence to the following recommendations may be of assistance in attaining high levels of operating efficiency with the vented cup ballistic separation apparatus 160. More particularly, it is preferred to locate the upper edge or lip portion 196 of shroud or annular chamber 180 in a zone within the range of about 2D (two riser diameters) upstream or up to about 3D downstream of the riser outlet comprising lip portion 173. Edge 196 of the annular chamber may be located between about one riser diameter D upstream and one riser diameter D downstream from lip 173. It appears that positioning the edge 196 just below the riser outlet lip 173 as shown in the drawing is quite satisfactory.

As shown in FIG. 2, the outlet section 166 discharges the suspension catalyst into an enlarged velocity reducing space downstream of the riser outlet. In this embodiment the catalyst particles of sufficient preselected momentum are projected generally vertically along discharge paths generally represented by $P_1$ and having components of direction in a downstream direction, based on the direction of the catalyst and cracked vaporous products stream discharged from outlet section 166. The product vapors of lower momentum and projected from the downstream end of outlet section 166 with catalyst rapidly disperses as a stream S which diverges outwardly from the catalyst paths $P_1$ and into the opening to the annular chamber for withdrawal by conduit 190 and 192.

When the lip portion 173 of the riser out projects downstream of lip edge 196 of the annular zone or chamber, the gaseous conversion products of hydrocarbon cracking are caused to separate from catalyst particles and flow around the corner formed by lip portion 173 as indicated by arrow S into the annular collection flow passageway 186. The momentum of the catalyst particles, which is far greater than that of the product vapors, prevents catalyst particles flow along the curved flow path indicated by arrow S. The flow of vaporous or gasiform material is encouraged by maintaining a slightly lower pressure in conduits 190 and 192.

This particular embodiment illustrates how a major portion of the product vapors or gasiform material which have been discharged from the downstream end of riser section 166 can be caused to divert from the vertical axis X—X of the drawing by an angle of divergence of at least about 45° or more degrees and in a very limited portion of the disengagement chamber 92 absent catalyst particles and downstream of the riser outlet. This embodiment also illustrates how the catalyst particles of sufficient momentum are caused to impinge upon dome shaped head can be caused, at a position Z of FIG. 2 to turn outwardly from axis X—X as a result of impingement and velocity reduction to travel laterally in said disengagement chamber absent substantial gasiform material as indicated by flow lines $P_2$, $P_3$ and $P_4$ downwardly and generally along the walls of the disengaging vessel to a lower stripping zone not shown.

Figure 3:
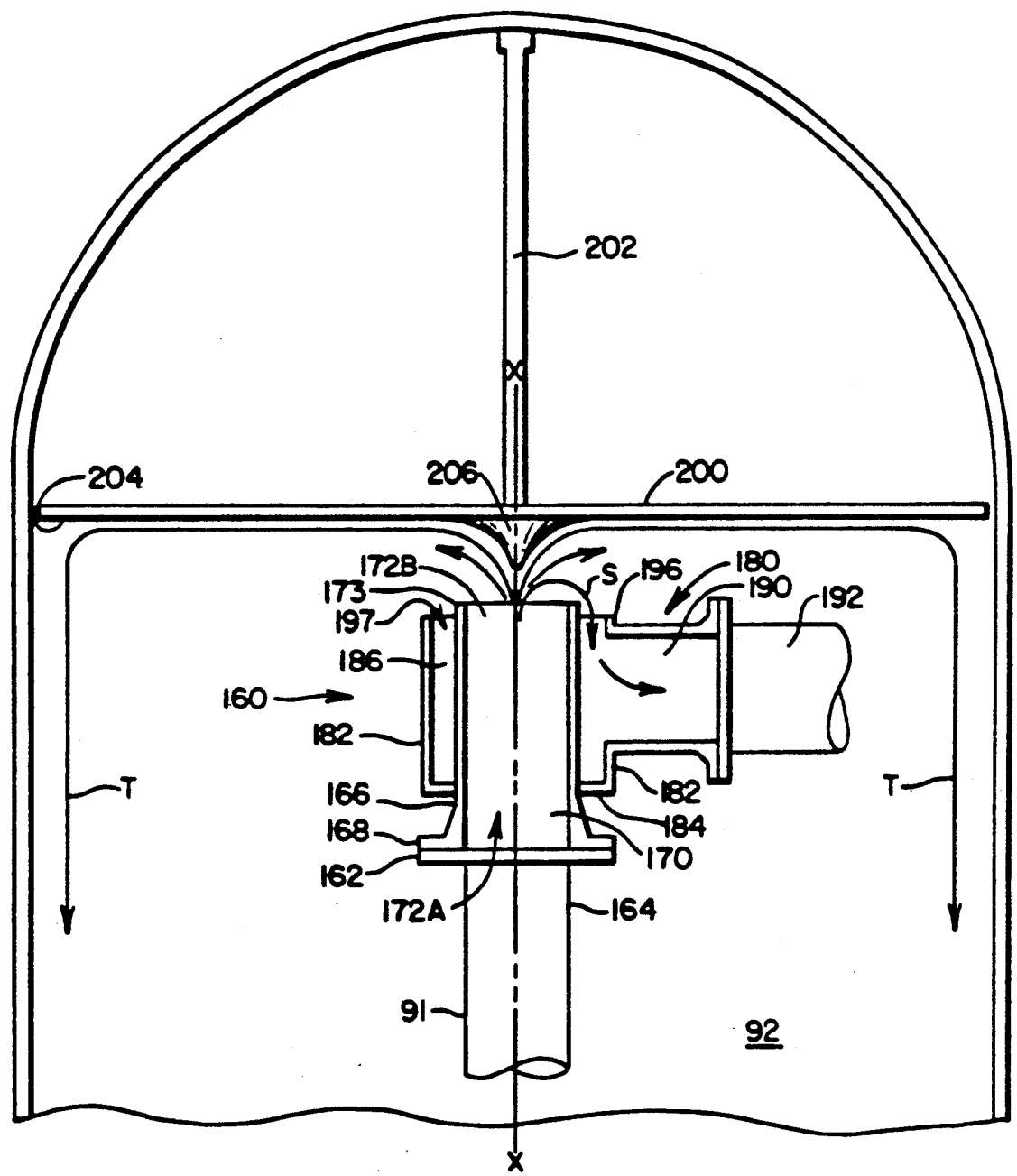
FIG. 3 is a diagrammatic sketch similar to FIG. 2 except for the placement of a horizontal baffle intermediate the riser outlet and the dome vessel head.

A modification of the foregoing separation apparatus is disclosed in FIG. 3. It can for example include all of the parts previously described in connection with FIG. 2, along with a target baffle member other than the vessel dome shaped head which is spaced intermediate the riser outlet and the vessel head. The target may be of any suitable shape and size for promoting orderly directional flow of the catalyst particles outwardly and away from the inlet to the annular chamber above discussed such as for example a flat plate as shown in FIG. 3, a segment of a sphere such as when the catalyst discharged against the inside of the dome shaped hemispherical head portion of the disengagement chamber as shown in FIG. 2. The sphere segment may also be positioned above the riser outlet to resemble a concave or convex baffle member for deflecting the catalyst.

In general, it is preferred that the target be at least about three times the overall width of the discharged catalyst stream discharged from the downstream end of riser section 166. It is believed advantageous to position the target baffle downstream or above the riser outlet by a distance in the range of about ½ to about 5, more preferably about 1.5 to about 3, and most preferably about 1.5 or 2 times the overall width of the discharged stream of catalyst. When a target baffle is used, the catalyst is projected into space downstream of outlet section 166 which is open at least in a direction divergent outwardly from axis X—X.

In the embodiment of FIG. 3, target 200 intersects the vertical axis X—X of riser section 166, and is rigidly mounted within the disengagement chamber 92 by suitable hanger rods 202. Target baffle 200 preferably includes an impact surface 206 which diverts the catalyst flow path extending downstream from the riser outlet section 166.

During operation, a flow of catalyst particles and a portion of the products of cracking discharged from the riser outlet will continuously impact against surface 204 or 206. As the flow of catalyst and gases approach baffle 200, the flow is diverted in a radially outward direction towards the vessel wall with catalyst particles falling away from the outer portions of target 200 under the influence of velocity reduction and particle settling as indicated by catalyst flow paths T.

The catalyst particles are preferably discharged from the riser outlet section 166 with sufficient velocity, for example about 60 to about 100 feet per second, and sufficient to ensure that their momentum is greater than the vapor momentum or that on striking surface 204, the catalyst particles will move outward along a target baffle 200 until the majority of the catalyst particles are well beyond the outer wall 182 of annular zone 180. It is possible for the catalyst stream exiting outlet section 166 to form a pressure cone on the baffle surface which assists in diverting catalyst particle flow outwardly along target baffle impact surface 204. When the catalyst particles separate from target baffle 200, they are sufficiently away to miss vapor collection flow passageway 186 as catalyst particles fall downwardly through disengagement chamber 92 under the influence of gravity. In comparison, the gaseous conversion products of lower momentum which impact against target 200 tend to quickly separate from catalyst particles and swirl through an adjacent area until drawn into collection flow passageway 186. It may also be beneficial to mount a deflection cone 206 on target baffle 200 to initiate a rapid change in direction of the impinging catalyst stream discharged from the riser outlet 166.

During fluid catalytic cracking operations, a stream of hydrocarbon product vapors admixed with diluent vapors and solid catalyst particles flow downstream through a tubular conduit or zone at velocities of about 25 to 100 or more feet per second. As the stream discharges from the downstream end of the tubular outlet it may be desirable to adjust the stream velocity by reducing or increasing the cross-section of passageway 170 in the downstream direction. For a relatively slow velocity stream flowing through the riser, such as about 45 feet per second, it may be desirable to decrease the cross-sectional area of the riser passageway 170 to increase the velocity of the stream prior to discharge from the outlet section. Alternatively, if a relatively high velocity stream of gases and particles is flowing through the riser, e.g. about 80–100 feet per second, it may be desirable to increase the cross-sectional area of the riser passageway 170 to decrease the velocity of the stream prior to discharge from the outlet section.

The cross-sectional area of the annular inlet 197 or collection passageway 186 about riser outlet section 166 should be small enough in comparison to the downstream open end area of the riser outlet secton to minimize the opportunity for catalyst particles to gain entry into the annular section 197. At the same time, the cross-sectional area of this gasiform material collection passageway 186 should be large enough to accomplish unrestricted withdrawal of separated gasiform material.

In the design of the equipment, one will of course properly size the system components and adjust downstream processing equipment to provide adequate pressure drop from the riser discharge to the outlet 192 to promote flow of the product vapors from the outlet section 166 to outlet 192 and thence to downstream processing equipment such as cyclones not shown.

What is claimed is:
1. In a method for converting carbo-metallic containing residual oils to form upgraded liquid products by mixing (a) a dispersing diluent material; (b) a 343° C. (650° F.)-plus residual oil feed characterized by a Conradson carbon value of at least about 1 wt % and comprising at least about 4 ppm of heavy metals nickle equivalents; and (c) fluidizable solid particle material to form a flowing suspension comprising all three components (a), (b) and (c) combined at an elevated hydrocarbon conversion temperature in a progressive flow reaction zone, said formed suspension is passed through said reaction zone for a hydrocarbon vapor residence time less than 5 seconds at a temperature providing a hydrocarbon feed conversion to hydrocarbon product vapors in the range of about 50% up to about 90% during deposition of carbonaceous material on said solid particles, said suspension of hydrocarbon product vapors and solid particles pass through a substantially unobstructed open end in said reaction zone into a larger disengaging zone, the improvement which comprises:

(a) discharging said suspension from said reaction zone at a velocity of 55 to 100 ft/sec. imparting greater momentum to said solid particles than to said hydrocarbon product vapors whereby instantaneous separation of at least about 80 wt. % of the vapors from said solid particles occurs;

(b) encouraging separation of solids from remaining vapors following discharge from said reaction zone by diverting solids from said remaining vapors by directional impingement on a target baffle and by providing a lower pressure vapor recovery zone in open communication with one or more cyclone separation zones outside the reaction zone open end;

(c) recovering solid particles separated by momentum from said suspension and diverted laterally from said vapor recovery zone as a mass of collected solid particles;

(d) stripping and regenerating said collected solid particles in a sequence of separate zones; and (e) recycling hot regenerated solids to said reaction zone for contact with the residual oil feed.

2. The method of claim 1 wherein said solid particle material is selected from one of catalyst particles, inert solid particles, or coke particles.

3. The method of claim 1 wherein said vapor recovery zone is a substantially rectangular cross-sectioned cup-shaped shroud with the inlet thereto at a height equal to, above or below the outlet of said reaction zone.

4. The method of claim 1 wherein regeneration of the solid particles is effected in a regeneration operation wherein a suspension of hot solid particles and regeneration flue gases is discharged from a riser regeneration zone under conditions imparting a greater momentum to said regenerated solid particles than to said flue gases and flue gases of lesser momentum are separately withdrawn from regenerated solid particles into a lower pressure zone about the upper open end of the riser communicating with one or more cyclone separation zones.

5. In a method for catalytically converting carbometallic containing oil feeds to form desired liquid products comprising gasoline and cycle oils the improvement which comprises:

(a) obtaining an oil feed containing 343° C.+ (650° F.+) material characterized by a carbon residue on pyrolysis of at least about 1 wt % and containing at least about 4 parts per million of nickel equivalents of heavy metal(s);

(b) bringing said oil feed in contact with cracking catalyst particles at an elevated temperature to form a suspension of said particles in said feed and thereafter passing said suspension through a progressive flow elongated reaction zone, said elongated reaction zone terminating in an open outlet end thereof equal to the reaction zone diameter for discharging said formed suspension at a temperature from 900° to 1400° F. a larger disengagement zone;

(c) maintaining said suspension in said elongated reaction zone for a hydrocarbon vapor residence time less than about 5 seconds at said temperature of from about 482° C. to about 760° C. (900° to about 1400° F. ) and under a total pressure of about 10 to about 50 pounds per square inch absolute to obtain a conversion per pass of said oil feed in the range of about 50% to about 90% while producing coke laid down on the catalyst in amounts in the range of about 0.3 to about 3% by weight;

(d) discharging the catalyst and product vapors suspension from the open end of said elongated reaction zone into said larger zone at a velocity sufficient to establish a momentum differential between catalyst particles and vaporous products, whereby at least about 80% by volume of said vaporous products are instantaneously separated into a zone of lower pressure, and projecting at least 90% of the catalyst particles of high momentum against a target baffle and then along one or more diverted discharge paths along the wall of domed head substantially outside of the path of the discharged vapors of lower momentum;

(e) recovering remaining product vapors separated from higher momentum catalyst particles by one or more radiating passageways in open communication with the zone of lower pressure adjacent to the reaction zone outlet whereby separated vapors are passed to one or more cyclone separation zones;

(f) collecting diverted catalyst particles separated by the momentum differential and the target baffle from said vapors and stripping the collected catalyst particles with a stripping gas;

(g) regenerating said stripped catalyst with oxygen containing combustion-supporting gas in a regeneration zone comprising two separate catalyst beds undergoing sequential regeneration under conditions of time, temperature and an oxygen atmosphere sufficient to progressively reduce the carbon on the catalyst to about 0.25% by weight or less, while forming combustion-product gases at a temperature within the range of 640° C. to 815° C. (1200° F. to 1500° F. ) comprising CO and $CO_2$; and (h) passing regenerated catalyst at a temperature up to 815° C. (1500° F. ) to the reaction zone for contact with the fresh oil feed.

* * * * *